(12) United States Patent
Yamamoto et al.

(10) Patent No.: US 6,856,345 B1
(45) Date of Patent: Feb. 15, 2005

(54) DIGITAL CAMERA HAVING A PRINTING FUNCTION IN WHICH A MOVABLE CAMERA PART IS MOVED FROM AN IN-USE POSITION TO AN OUT-OF-USE POSITION DURING PRINTING

(75) Inventors: Koji Yamamoto, Kawanishi (JP); Tohru Murakami, Okazaki (JP); Toru Ishii, Hirakata (JP); Akira Fukuda, Osaka (JP); Yoshiharu Tanaka, Kawachinagano (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 948 days.

(21) Appl. No.: 09/598,464

(22) Filed: Jun. 22, 2000

(30) Foreign Application Priority Data

Jun. 24, 1999 (JP) .......................................... 11-178295

(51) Int. Cl.[7] .............................................. H04N 5/225
(52) U.S. Cl. ..................... 348/207.2; 348/335; 348/371
(58) Field of Search ......................... 348/207.99, 207.1, 348/207.11, 207.2, 333.01, 333.06, 333.07, 333.13, 370, 371, 372, 373, 374, 375, 220.1, 221.1, 335; 386/96; 396/349, 448; 250/208.1; 358/1.1, 3.32

(56) References Cited

U.S. PATENT DOCUMENTS

| | | | |
|---|---|---|---|
| 5,493,409 A | | 2/1996 | Maeda et al. |
| 5,625,852 A | | 4/1997 | Wada et al. |
| 5,847,836 A | | 12/1998 | Suzuki |
| 5,894,326 A | * | 4/1999 | McIntyre et al. ...... 348/333.06 |
| 5,917,548 A | * | 6/1999 | McIntyre ............... 348/333.06 |
| 6,317,156 B1 | * | 11/2001 | Nagasaki et al. ........... 348/373 |
| 2002/0031351 A1 | * | 3/2002 | Hirai .......................... 396/429 |

FOREIGN PATENT DOCUMENTS

| | | |
|---|---|---|
| JP | 3-29471 | 2/1991 |
| JP | 9-116843 | 5/1997 |

* cited by examiner

*Primary Examiner*—Tuan Ho
(74) *Attorney, Agent, or Firm*—McDermott Will & Emery LLP

(57) ABSTRACT

There is provided a digital camera having a printing function, the camera having a moving member for moving from an out-of-use position to an in-use position to perform a shooting operation, a selector for selecting a printing operation to be performed, and a controller for bringing the moving member into the out-of-use position in response to the selection of the printing operation by the selector.

9 Claims, 21 Drawing Sheets

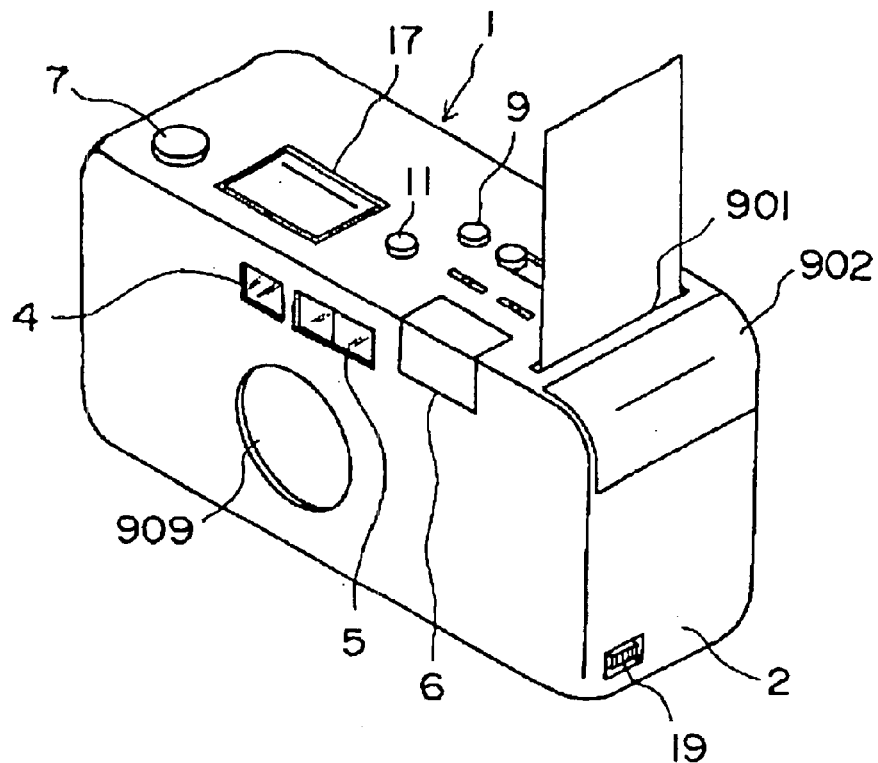
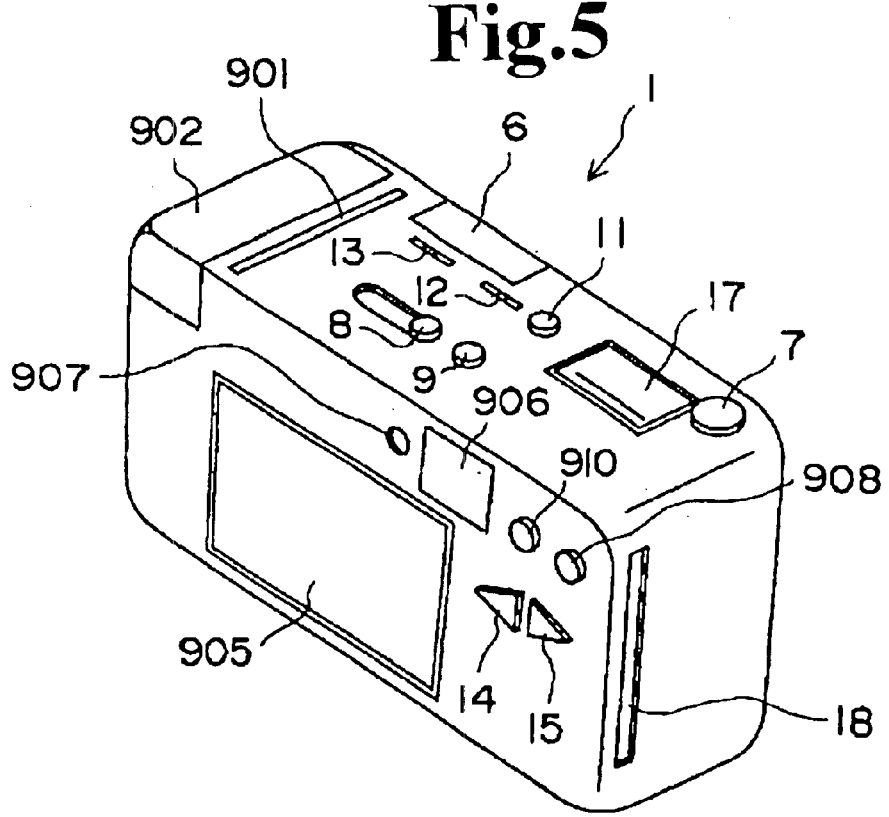

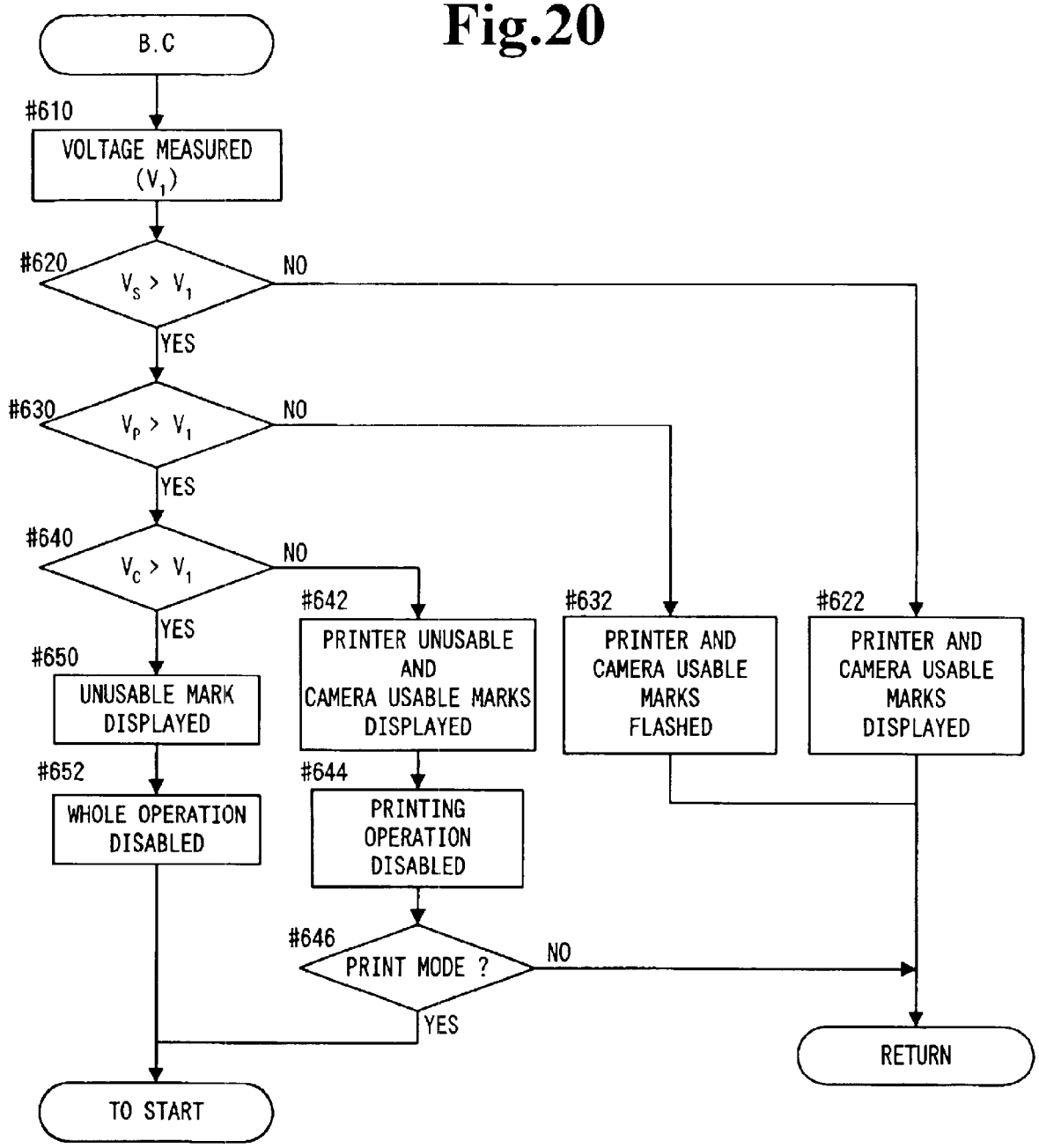

504 — ON
506 — ON

504 — FLASH
506 — FLASH

504 — UNUSABLE
506 — FLASH

504 — UNUSABLE
506 — UNUSABLE

209'
ON

207'
FLASH

DIGITAL CAMERA HAVING A PRINTING FUNCTION IN WHICH A MOVABLE CAMERA PART IS MOVED FROM AN IN-USE POSITION TO AN OUT-OF-USE POSITION DURING PRINTING

This application is based on the application No. 11-178295 filed in Japan, the content of which is hereby incorporated by reference.

BACKGROUND OF THE INVENTION

1. Technical Field of the Invention

The present invention relates to a digital camera having a printing function.

2. Description of the Related Art

A digital camera having a printing function is well known. For example, a digital camera combined with a printer is disclosed in Japanese Unexamined Patent Publication No. HEI 3-29471.

In the foregoing digital camera combined with the printer, however practical usability on the product level has not been considered. Specifically, consideration has not been given to the behavior of the camera during a printing operation which may take a longer period of time than a shooting operation in the camera. In particular, consideration has not been given to the behavior of a member for performing a protruding operation or the like with respect to the main body of the camera during the printing operation.

If attention is focused on the operation of a lens barrier and a lens barrel, fore example, the lens barrel protruding from the open barrier during the printing operation will cause the whole camera to lose balance. In addition, the camera may tip over as a result of vibration during the printing operation. In that case, the lens may break or become damaged. There is also the possibility that the apparatus may sway from being off balance during printing, which may adversely affect the result of printing. A pop-up flash would similarly cause the whole camera to lose balance if the pop-up flash is in a popped-up state, i.e., in use.

Although the operation of charging the capacitor of a flash is inhibited during the printing operation in accordance with the disclosure of Japanese Unexamined Patent Publication No. HEI 9-116843, consideration has not been given to the operation of the pop-up flash.

It is therefore an object of the present invention to provide a digital camera having a printing function wherein a moving member typical of the function of the camera is prevented from causing the whole apparatus to lose balance during a printing operation and adversely affecting the printing operation.

BRIEF DESCRIPTIONS OF THE INVENTION

Summary of the Invention

The present invention may include a digital camera having a printing function, the camera comprising a moving member for moving from an out-of-use position to an in-use position to perform a shooting operation; a selector for selecting a printing operation to be performed; and a controller for bringing the moving member into the out-of-use position in response to the selection of the printing operation by the selector.

As a result, the moving member is prevented from causing the whole camera to lose balance during printing and adversely affecting the printing operation.

In one embodiment of the digital camera, the moving member is a flash protruded from a storage position in a camera main body during shooting and, in response to the selection of the printing operation, the controller drives the flash to the storage position in the camera main body.

In another embodiment of the digital camera, the moving member is a shooting lens barrel protruding from a camera main body during shooting and, in response to the selection of the printing operation, the controller drives the shooting lens barrel to a collapsed position.

The present invention may further include a digital camera having a printing function comprising: a lens cover for moving from an in-use position to an out-of-use position to perform a shooting operation; a selector for selecting a printing operation to be performed; and a controller for driving the lens cover to the in-use position in which a shooting lens is covered therewith in response to the selection of the printing operation.

Other objects, features, and advantages of the invention will become apparent from the following description and from the claims.

BRIEF DESCRIPTION OF THE DRAWINGS

The accompanying drawings, which are incorporated in and form a part of the specification, illustrate an embodiment of the present invention and, together with the description; serve to explain the principles of the invention. In the following description, like parts are designated by like reference numbers throughout the several drawings. In the drawings:

FIG. 4 is a perspective view similar to FIG. 2;

FIG. 5 is a perspective view of the camera of FIG. 1 when it is viewed from the back side;

FIG. 20 is a flow chart illustrating battery checking;

DETAILED DESCRIPTION OF THE PRESENT INVENTION

Preferred Embodiments of the Invention

Figure 1:
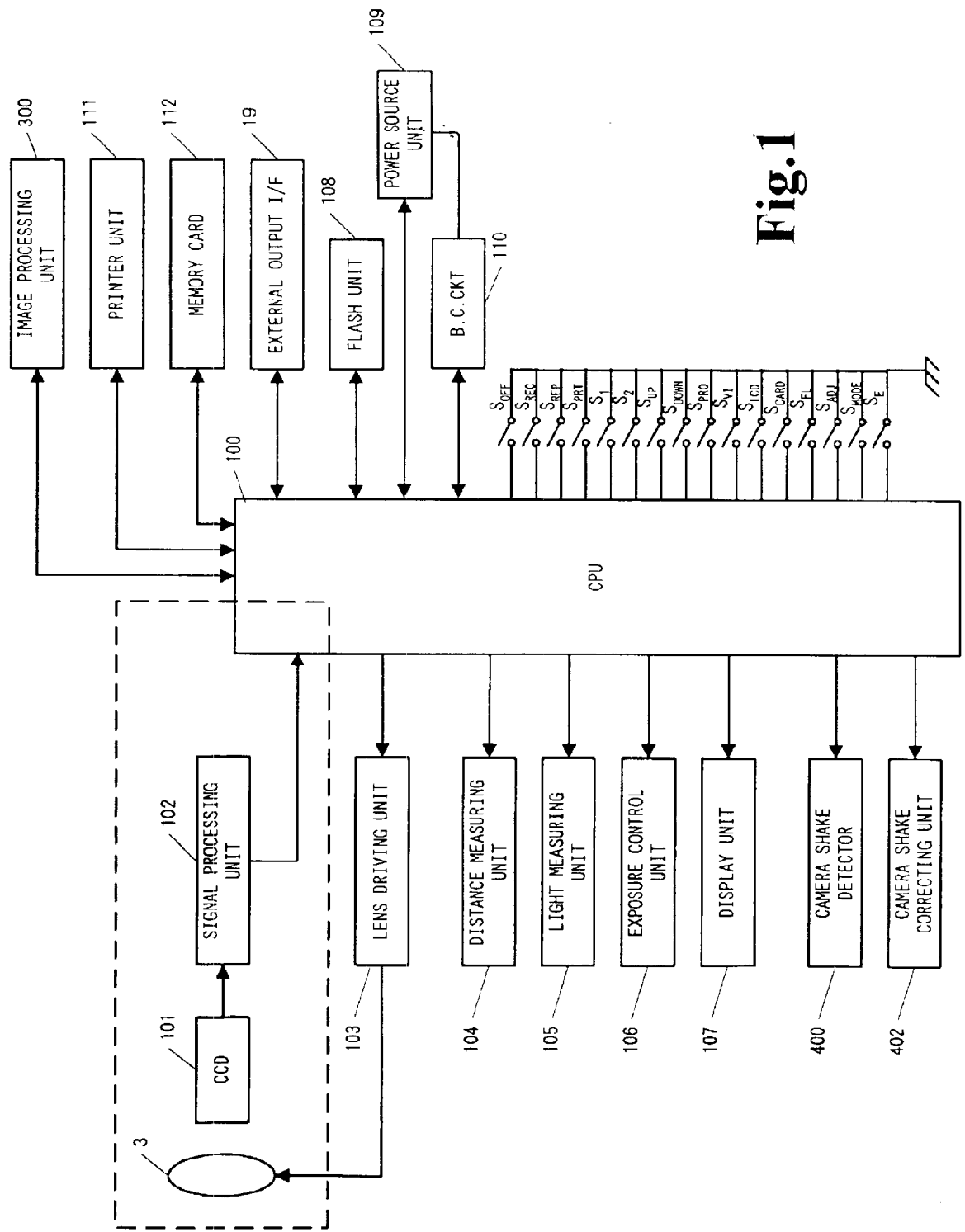
FIG. 1 is a structural block diagram of a digital camera having a printing function according to an embodiment of the present invention.

Hereinafter, embodiments of the present invention will be described with reference to the drawings.

Referring now to the drawings, a digital camera having a printing function according to an embodiment of the present invention will be described.

FIGS. 2 to 5 are overall perspective views of the digital cameral in accordance with the present invention.

In the drawings, 1 denotes a camera main body and 2 denotes a printer unit portion internally provided with components required to perform a printing operation, as will be described later.

The front face of the camera main body 1 is provided with: a shooting lens finder window 4; an AF unit 5 for automatic focus detection (hereinafter referred to as AF); and a flash 6 which pops up from the main body. A lens barrel 30 for holding the shooting lens 3 has been so constructed as to be extendable from and retractable into the camera main body 1. When the lens barrel 30 has collapsed, a lens barrier 909 is closed to cover the shooting lens 3.

Various operational members 7, 8, 9, 11, 12, and 13 and a display element 17 are disposed on the top face of the camera main body 1. Item 7 denotes a release/print start switch as the operational member. During shooting, a switch $S_1$ is turned ON (start shooting preparation) when the switch 7 is half-pressed and a switch $S_2$ is turned ON when the switch 7 is full-pressed. During printing, the switch 7 functions as the operational switch for starting printing. Item 8 is a mode changeover switch for switching among the individual modes of "OFF", "record", "reproduce", and "print". Item 9 denotes a protect switch for preventing an image once recorded from being erased by a careless operation. Item 11 denotes a flash light emission mode changeover switch for switching the flash 6 among the individual modes of "no light emission (OFF)", "automatic light emission (AUTO)", and "forced light emission (ON)". Item 12 denotes a date setting switch to be used in setting a shooting date. Item 13 denotes a shooting mode changeover switch for changing the shooting modes of single shooting, self-timer shooting, and continuous shooting. The display element 17 is composed of, e.g., an LCD and displays the date, a frame number during shooting or printing, and the contents of other set modes.

Figure 3:
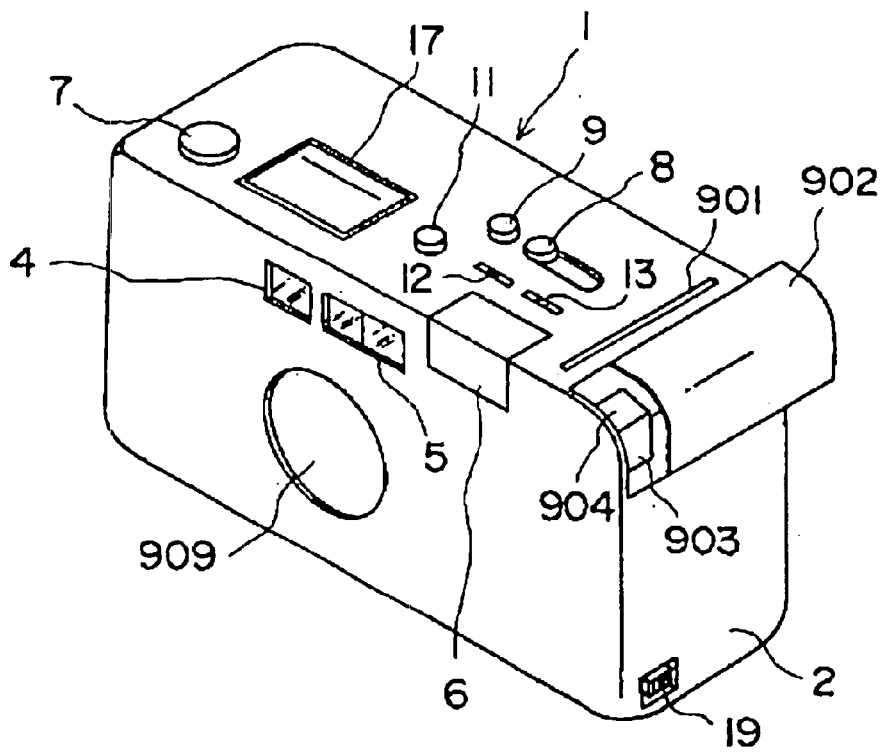
FIG. 3 is a perspective view similar to FIG. 2.

The top face of the camera main body 1 is further provided with a printed sheet outlet 901. A printed sheet is discharged as shown in FIG. 4. Item 902 denotes a sliding portion which is slidable, as shown in FIG. 3. By using an opening defined by the sliding portion 902, an inkjet cartridge 903 can be replaced. The cartridge 903 is fixed by a lid portion 904. The cartridge 903 can be removed laterally from the camera main body 1 by using fingers when the lid portion 904 is detached upwardly. A specified number of sheets to be printed can be loaded by insertion from the lower portion of the camera main body 1, though they are not shown in the drawings. A detailed description will be given later to a printer unit 111 provided in the camera main body 1.

A memory card insertion slot 18 is provided in one side face of the camera main body 1. A PC output terminal 19 is provided in the other side face of the camera main body 1. The memory card insertion slot 18 is an insertion slot formed to have a slit-like configuration, through which an external recording medium (hereinafter referred to as a memory card) is inserted into the camera main body 1. The PC output terminal 19 is provided at an appropriate position of the side face of the camera main body 1 to allow connection to a PC (personal computer).

As shown in FIG. 5, switches 14, 15, 910, and 908 are provided on the back face of the camera main body 1. In addition, a finder window 906, a focusing display lamp 907, and an image display LCD 905 are provided on the back face of the camera main body 1.

The switches 14 and 15 are zoom switches. When the zoom switch 14 is pressed, the shooting lens 3 is driven toward the extreme wide-angle position. When the zoom switch 15 is pressed, the shooting lens 3 is driven toward the extreme telephoto position. The switches 14 and 15 also serve as access switches for calling up image data recorded in a memory card 112, which will be described later. Every time the switch 14 is operated, recorded images to be called up are forwardly shifted (UP). Every time the switch 15 is operated, the recorded images are backwardly shifted (DOWN).

The switch 908 is an LCD switch for the turning ON/OFF of the image display LCD 905. The switch 910 is a camera shake correction switch for the turning ON/OFF of a camera shake correcting operation. During shooting, the user can view an image to be shot through the finder window 906. The image display LCD 905 displays a monitored image during shooting, while displaying a recorded image during reproduction and printing.

The focusing display lamp 907 is lit when the shooting lens is driven to a focusing position after the switch 7 is half-pressed (the switch $S_1$ is turned ON) during shooting and a shooting preparing operation is completed. The focusing display lamp 907 flashes if a subject to be shot is at near range and therefore unshootable or if the flash is under charging. The focusing display lamp 907 is also used in the print mode. The focusing display lamp 907 is lit when the print mode is set and flashes if an error occurs in the print mode.

FIG. 1 is a block diagram of the whole camera.

A system controller (hereinafter referred to as a CPU) 100 is for controlling the operation of the whole camera including a printing operation. A subject image formed through the shooting lens 3 is inputted to a solid state image pickup device (hereinafter referred to as CCD) 101. An output image signal from the CCD 101 is processed in a signal processing unit 102, which will be described later in detail. Based on the result of distance measurement, the shooting lens 3 is driven under the control of a lens driving unit 103 to achieve focusing. A distance measuring unit 104 obtains a distance to the subject by using a phase difference detection system and calculates the extent to which the shooting lens 3 should be driven by the lens driving unit 103 based on the distance measurement data. The lens driving unit 103 also drives the lens barrel 30 holding the shooting lens 3 to protrude or retract and drives the lens barrier 909 to open or dose. Methods of collapsing a lens barrel by means of a lens driving unit and a mechanism for opening and closing a lens barrier by means of a lens driving unit are well known, such as is described in U.S. Pat. No. 5,489,958 to Moriya et al. A light measuring unit 105 measures the luminance of the subject and outputs light measurement data to the CPU 100. An exposure control unit 106 receives, from the CPU 100, data on an exposure time (shutter speed) Tv and a f/number Av obtained based on the result of light measurement to control exposure. A display unit 107 is composed of the display element 17, the LCD 905, and a portion for driving the display element 17 and the LCD 905.

A camera shake detector 400 detects the amount of camera shake during shooting by means of an acceleration sensor provided within the camera main body 1. Based on the result of detecting camera shake from the camera shake detector 400, a camera shake correcting unit 402 corrects the camera shake. Specifically, the camera shake correcting unit 402 corrects the camera shake by driving a correcting optical member in a shooting optical system in a direction perpendicular to an optical axis by using an actuator. An image processing unit 300 processes an image signal and, if necessary, processes an image such that it is outputted to the image display LCD 905 and to the printer unit 111.

A flash unit 108 is controlled by a voltage increase control signal for charging and a light emission control signal, which are outputted from the CPU 100, and causes the flash 6 to emit light. The flash unit 108 also drives the flash to an in-use position (pop up) or to an out-of-use position (pop down) based on a control signal from the CPU 100. Mechanisms for driving a flash to the in-use position and to the out-of-use position are well known, such as is described in U.S. Pat. No. 5,625,852 to Wada et al.

A power source unit 109 supplies electric power at a predetermined high voltage to the CCD 101 and supplies electric power at a predetermined voltage to the CPU 100 and to the other circuit components. A battery check circuit 110 is connected to a power source battery within the power source unit 109 and detects the capacitance of the power source battery. The result of detection is outputted to the CPU 100.

The printer unit 111 is driven under the control of the CPU 100 to print out the image signal onto a recording sheet, which will be described later in detail. The memory card 112 is a recording medium detachable from the camera main body 1, which is composed of, e.g., a SRAM in which plural frames of images can be recorded. An external output interface (I/F) 19 corresponds to the PC output terminal of FIG. 2.

Next, a description will be given to switches $S_{OFF}$ to $S_E$.

The switch $S_{OFF}$ is turned ON when the mode changeover switch 8 is in the "OFF" position to disable the operation of the camera.

The switch $S_{REC}$ is turned ON when the mode changeover switch 8 is in the "record" position to enable the camera to shoot.

The switch $S_{REP}$ is turned ON when the mode changeover switch 8 is in the "reproduce" position to enable the transfer of an image to the PC or the like.

The switch $S_{PRT}$ is turned ON when the mode changeover switch 8 is in the "print" position to enable the printing out of the recorded image.

The switch $S_1$ is turned ON through single pressing (half-pressing) of the release/print start switch 7 during shooting and gives an instruction to start shooting preparation. The switch $S_2$ is turned ON through double pressing (full-pressing) of the release/print start switch 7 during shooting and gives an instruction to shoot. In the print mode, the switch $S_2$ gives an instruction to start printing.

The switch $S_{UP}$ is turned ON every time the switch 14 is pressed. During shooting, the switch $S_{UP}$ drives the shooting lens toward the extreme telephoto position. During reproduction, the switch $S_{UP}$ effects forward reproduction of recorded images.

The switch $S_{DOWN}$ is turned ON every time the switch 15 is pressed. During shooting, the switch $S_{DOWN}$ drives the shooting lens toward the extreme wide-angle position. During reproduction, the switch $S_{DOWN}$ effects backward reproduction of the recorded images.

The switch $S_{PRO}$ alternately protects the recorded images and cancels the protection every time the protect switch 9 is pressed.

The switch $S_{VI}$ detects the ON/OFF state of the camera shake correction switch 910.

The switch $S_{LCD}$ detects the ON/OFF state of the LCD switch 908.

The switch $S_{CARD}$ is turned ON when the memory card 112 is inserted.

The switch $S_{FL}$ is turned ON every time the flash light emission mode changeover switch 11 is pressed to cyclically switch the flash among the individual modes of no light emission, automatic light emission, and forced light emission.

The switch $S_{ADJ}$ corresponds to the date setting switch 12.

The switch $S_{MODE}$ is turned ON every time the shooting mode changeover switch 13 is pressed to cyclically change the shooting mode among single shooting, self-timer shooting, and continuous shooting.

The switch $S_E$ detects the ON/OFF state of an erase switch not shown.

Figure 6:
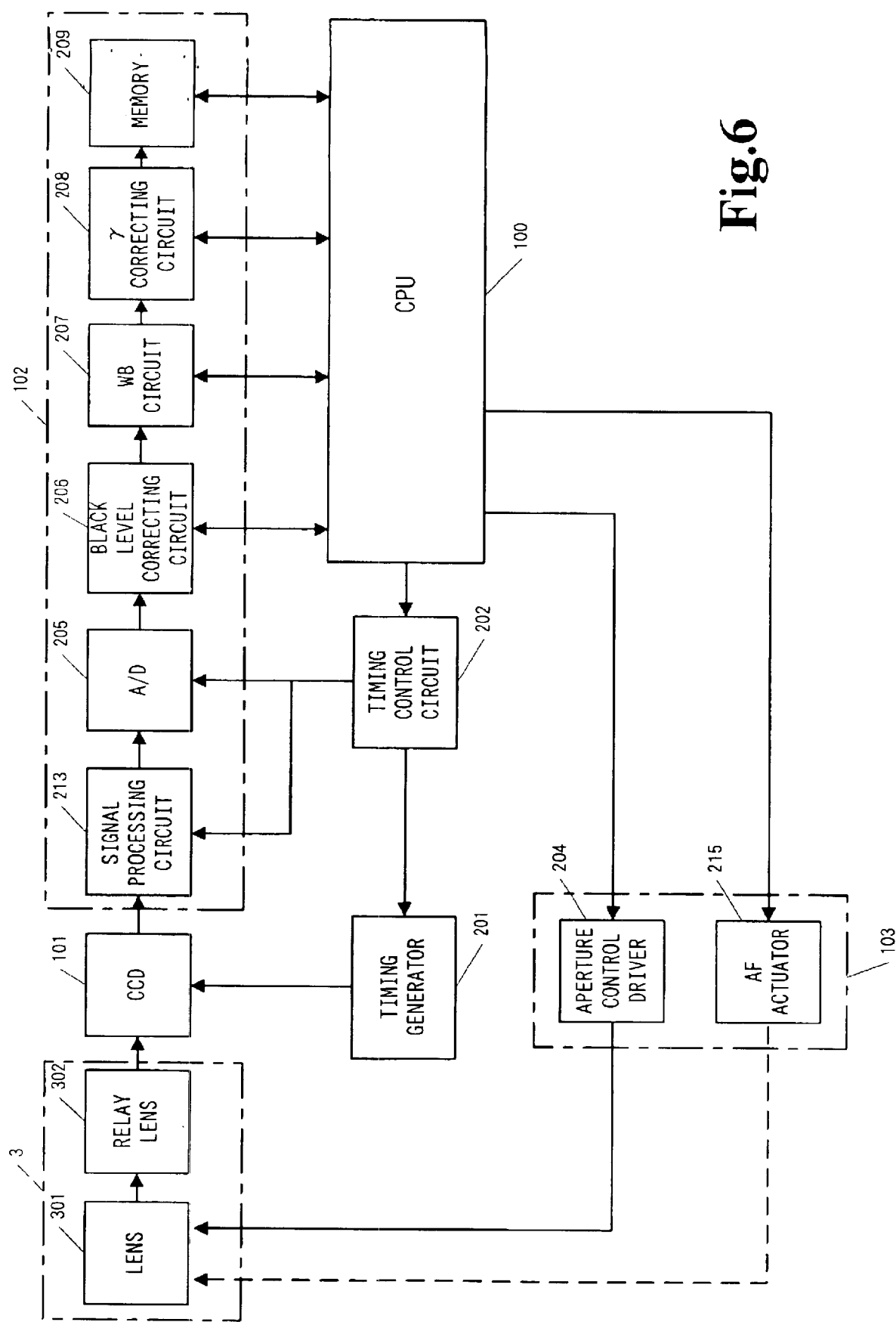
FIG. 6 is a detailed structural block diagram of the camera of FIG. 1.

FIG. 6 is a detailed block diagram showing the control system of an image pickup unit (the portion enclosed in the dotted rectangle in FIG. 1).

In FIG. 6, the CCD 101 is constructed as a color area sensor which photoelectrically converts an optical image of the subject formed by a lens 301 and a relay lens 302 to an image signal having R (red), G (green), and B (blue) color components (signal composed of a sequence of image signals received at individual pixels) and outputs the image signal.

A timing generator 201 generates a drive control signal to the CCD 101 based on a reference clock transmitted from a timing control circuit 202. The timing generator 201 generates clock signals such as a timing signal for the initiation/completion of integration (initiation/completion of exposure) and readout control signals for a received light signal from each pixel (such as a horizontal synchronize signal, a vertical synchronize signal, and a transfer signal) and outputs the individual signals to the CCD 101.

A signal processing circuit 213 performs specified analog signal processing with respect to an image signal (analog signal) outputted from the CCD 101. The signal processing circuit 213 has a CDS (correlated double sampling) circuit and an AGC (autogain control) circuit. The signal processing circuit 213 reduces the noise of the image signal by using the CDS circuit and adjusts the level of the image signal by adjusting the gain of the AGC circuit.

An A/D converter 205 converts each of the pixel signals of the image signal to a 10-bit digital signal. The A/D converter 205 converts each of the pixel signals (analog signals) to a 10-bit digital signal based on an A/D conversion clock from the timing control circuit 202.

A black level correcting circuit 206 corrects the black level of the pixel signal after A/D conversion (hereinafter referred to as pixel data) to a standard level. A WB (white balance) circuit 207 performs level conversion with respect to pixel data on each of the R, G, and B color components such that white balance is also automatically adjusted after γ correction. The WB circuit 207 corrects the level of pixel data on each of the R, G, and B color components by using a level conversion table within the overall control unit 100, i.e., the CPU 100. Conversion coefficients for the individual color components in the level conversion table (the inclinations of the characteristics) are set by the overall control unit 100 for each shot image.

A γ correcting circuit 208 corrects the γ characteristic of the pixel data. The γ correcting circuit 208 has, e.g., six γ correction tables with different γ characteristics to perform γ correction of the pixel data based on that one of the γ correction tables specified according to a scene to be shot and shooting conditions.

An image memory 209 is for storing the pixel data outputted from the γ correcting circuit 208. The image memory 209 has a storage capacity for one frame. If the CCD 101 has pixels in n columns and m rows, therefore, the image memory 209 has a capacity for storing data on n×m pixels such that each pixel data is stored at the corresponding pixel location.

In a shooting standby state, each pixel data on an image picked up by CCD 101 every 1/30 seconds is subjected to specified signal processing performed by the A/D converter 205 to the γ correcting circuit 208. The pixel data after signal processing is stored in the image memory 209 and displayed on the image display LCD 905 via the overall control unit 100. The photographer can visually recognize the optical image of the subject by the image displayed on the image display LCD 905. In the reproduction mode, the image read from the memory card 112 is subjected to specified signal processing performed in the image processing unit 300 via the overall control unit 100 and then reproductively displayed on the LCD display unit 905.

An aperture control driver 204 adjusts the f/number of an aperture provided in the lens 302 to a set value. An AF actuator 215 drives the lens 302 to a focusing position.

If the release/print start switch 7 is operated in the shooting mode to give an instruction to shoot, the overall control unit 100 generates a thumbnail image of the image inputted to the image memory 209 and an image compressed with a compressibility K set by using a compressibility setting switch (also used as the date its setting switch 12) in accordance with the JPEG method. The two-images are recorded on the memory card 112 along with tag data (data such as frame number, exposure value, shutter speed, compressibility K, shooting date, scene data, and the result of image judgment) on the shot image.

For example, 230 frames of images can be stored in the memory card 112 if the capacity of the memory card 112 is 64 MB and the compressibility K is 1/20. For each frame, a tag portion, high-resolution image data compressed in accordance with the JPEG method (1600×1200 pixels), and image data for thumbnail display (160×120 pixels) are recorded. It is possible to regard the image data as, e.g., an image file in the form of an EXIF on a frame-by-frame basis.

Figure 18:
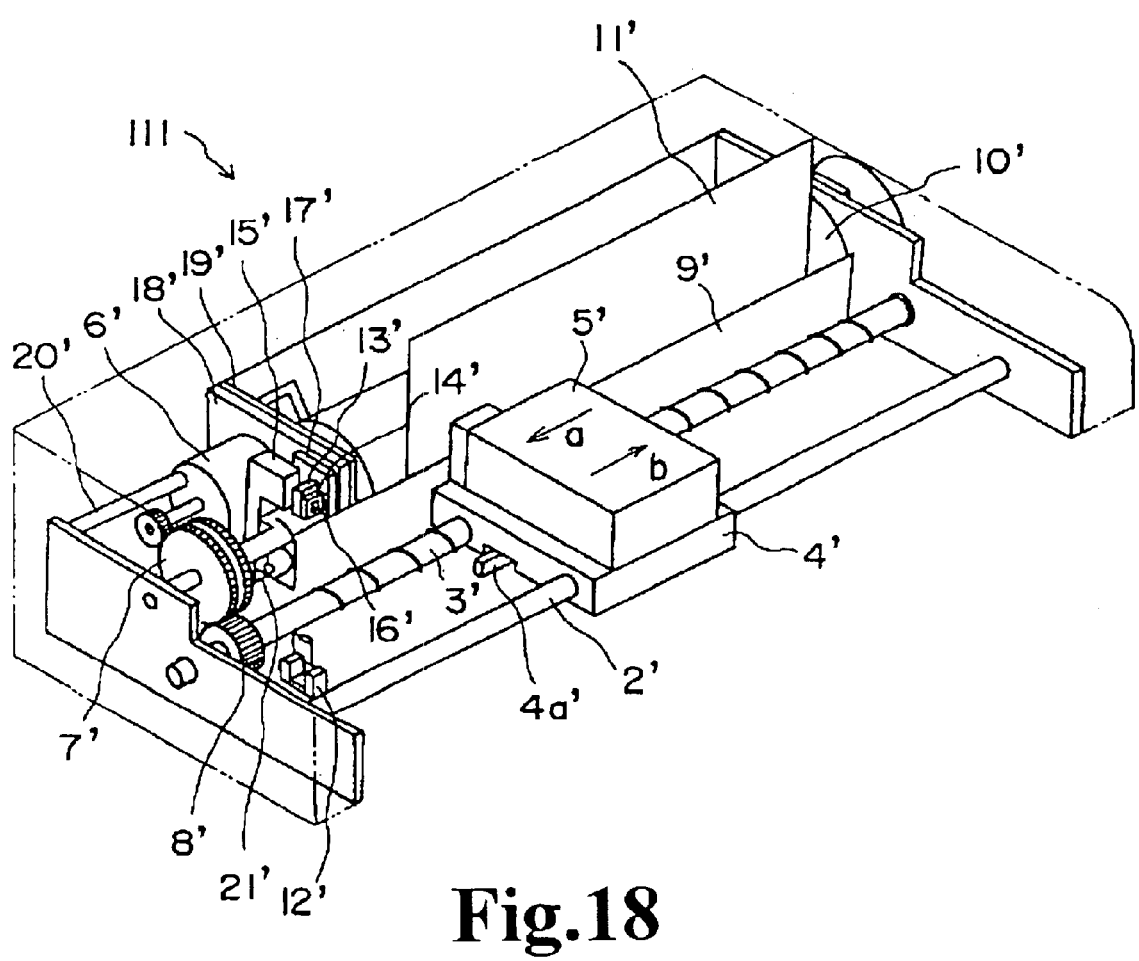
FIG. 18 is a perspective view of a printer unit.

Next, a description will be given to the construction of the printer unit 111 with reference to FIG. 18.

In a lower part of the housing of the camera main body 1, there are provided a guide shaft 2' and a lead screw 3' extending in parallel with each other. Between the guide shaft 2' and the lead screw 3', a recording head 5' (not shown) composed of an inkjet head cartridge is supported movably via a carriage 4'. The recording head 5' has heads for four colors of Y (Yellow), M (Magenta), C (Cyan), and K (Black) to allow full-color printing. The lead screw 3' is engaged with a drive motor 6' rotatable in forward and reverse directions via gears 7' and 8'. By rotating the lead screw 3' forwardly and reversely by means of the drive motor 6', the recording head 5' is moved in the directions indicated by the arrows a and b along the guide shaft 2'.

A paper pressing plate 9' and a platen 10' in the form of a roller are provided posterior to the lead screw 3'. A sheet 11' to be printed is supplied while it is pressed by the paper pressing plate 9' onto the platen 10'. The carriage 4' is provided with a lever 4a' protruding therefrom. Detecting means 12' composed of a photocoupler provided in the home position of the carriage 4' detects the lever 4a' to control the direction of rotation of the drive motor 6'.

Item 13' denotes a support member for supporting a cap member 14' with which the front face of the recording head 5' is capped. Item 15' denotes sucking means for sucking air from inside the cap member 14', which recovers the recording head 5' by suction via an opening 16' in the cap member 14'. Item 17' denotes a it cleaning blade. Item 18' denotes a member for rendering the cleaning blade 17' movable in the forward and backward directions, which is supported by a main body support plate 19'. Item 20' denotes a lever for initiating suction for recovery, which moves with the movement of a cam 21' engaged with the carriage 4'. The movement of the lever 20' is controlled by switching the driving force of the drive motor 6' by using well-known changeover means such as a clutch.

The digital camera has been constructed such that, of the capping by the cap member 14', the cleaning by the cleaning blade 17', and the suction recovery by the lever 20', a desired operation is performed by the action of the lead screw 3' when the carriage 4' is positioned in the home position area. The desired operation may also be controlled with well-known timing.

Although a well-known system using a piezoelectric element has been used as the inkjet printer in the present embodiment, it is not limited thereto. An ink-jet printer in a so-called bubblejet system provided with an electrothermal converting element may also be used instead.

Next, a description will be given to the operation of the digital camera of the present embodiment.

The operation of the camera is controlled by the CPU 100 in accordance with a program in a ROM (not shown) connected to the CPU 100.

FIGS. 7 to 10 are main flow charts illustrating the operation of the camera.

Figure 7:
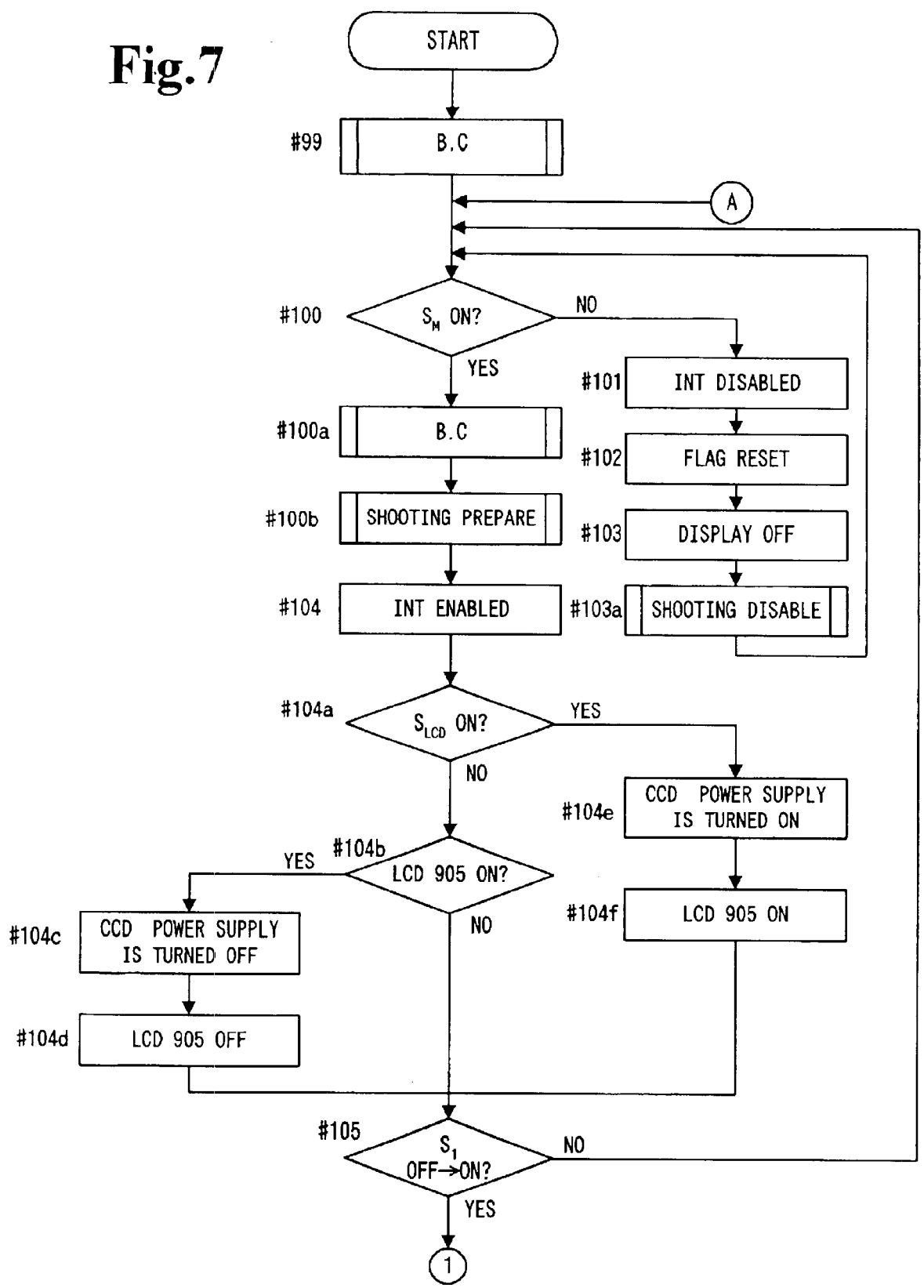
FIG. 7 is a flow chart illustrating an operation of the camera of FIG. 1.

As shown in FIG. 7, the power-source battery is attached to the power-source unit 109 to supply electric power to the CPU 100 and thereby initiate the operation. First, battery checking is performed (step #99).

Battery checking is performed in accordance with the flow chart shown in FIG. 20.

First, the voltage $V_1$ at the power-source battery of the power-source unit 109 is measured by the battery checking circuit 110 (step #610). The CPU 100 compares the magnitude of the voltage $V_1$ with those of three reference voltages $V_S$, $V_P$, and $V_C$ (steps #620, #630, and #640). Based on the result of comparison, the an displays 500 of FIG. 21A to 21D are shown on the display 17 (steps #622, #632, #642, and #650). Here, $V_S > V_P > V_C$ are satisfied.

Figure 21A:
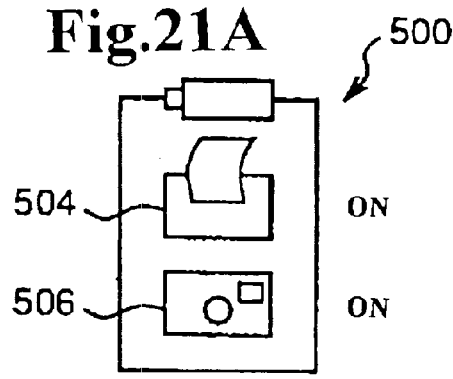
FIGS. 21A through 21D show an exemplary display indicative of the result of battery checking.

If $V_1 \geq V_S$ is satisfied (NO in step #620), each of the printer and camera is usable so that the printer mark 504 and the camera mark 506 are illuminated, as shown in FIG. 21A (step #622).

Figure 21B:
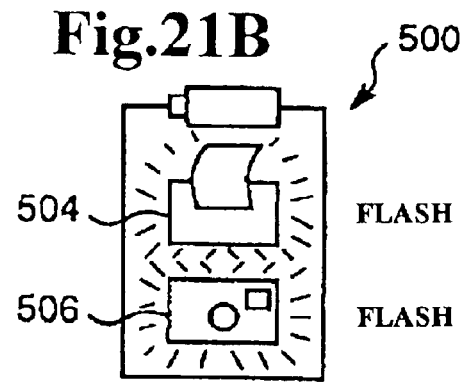
Figure 21C:
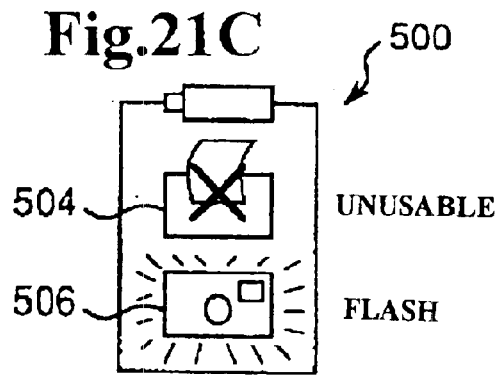

If $V_S > V_1 \geq V_P$ are satisfied (YES in step #620 and NO in step #630), each of the printer and the camera is usable but the power remaining in the power-source battery is low, so that the printer mark 504 and the camera mark 506 flash, as shown in FIG. 21B (step #632). If $V_P > V_1 > V_C$ are satisfied (YES in step #620, YES in step #630, and NO in step #640), the printer is unusable but the camera is usable so that the cross mark x is displayed in overlapping relation to the printer mark 504 and the camera mark 500 flashes, as shown in FIG. 21C (step #642). In addition, the operation of the printer unit 111 is disabled (step #644). Then, it is determined whether or not the print mode is established (step #646) and if the print mode is not established (NO in step #646), process flow returns. If the print mode is established (YES in step #644), the flow returns to "START" in FIG. 7 where the reattachment of the power source is awaited.

Figure 21D:
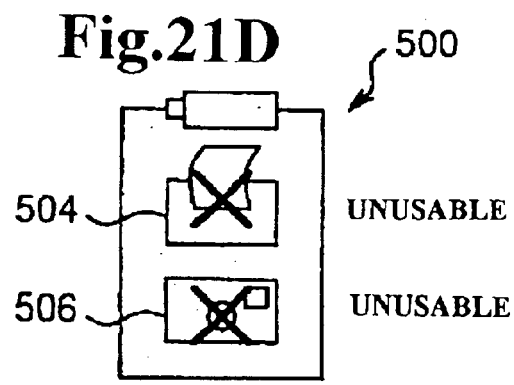

If $V_C > V_1$ is satisfied (YES in step #620, YES in step #630, and YES in step #640), each of the printer and camera is unusable so that the cross mark x is displayed in overlapping relation to each of the printer mark 504 and the camera mark 506, as shown in FIG. 21D (step #642). Then, the operation of the whole camera is disabled (step #652) and the flow returns to "START" in FIG. 7 where the reattachment of the power source is awaited.

It is to be noted that battery checking is performed appropriately in accordance with the flow similar to the foregoing, in addition to that performed in step #99 of FIG. 7.

Back to FIG. 7, it is judged whether or not the main switch SM has been turned ON (step #100) subsequently to the battery checking (step #99). The main switch SM is OFF when the mode changeover switch 8 is in the "OFF" mode position (i.e., when the switch $S_{OFF}$ is ON). In the other cases, i.e., if the mode changeover switch 8 is in any of the "record", "reproduce", and "print" mode positions (i.e., when the switch $S_{OFF}$ is OFF), the main switch SM is ON.

If the main switch SM is OFF (NO in step #100), an interrupt (INT), which will be described later, is disabled (step #101) so that a flag is reset (step #102). Then, if some indication is shown on the display 17, the indication is dismissed (step #103) and a shooting disable process is performed (step #103a). The flow returns again to step #100 where the turning ON of the main switch SM is awaited.

Figure 23:
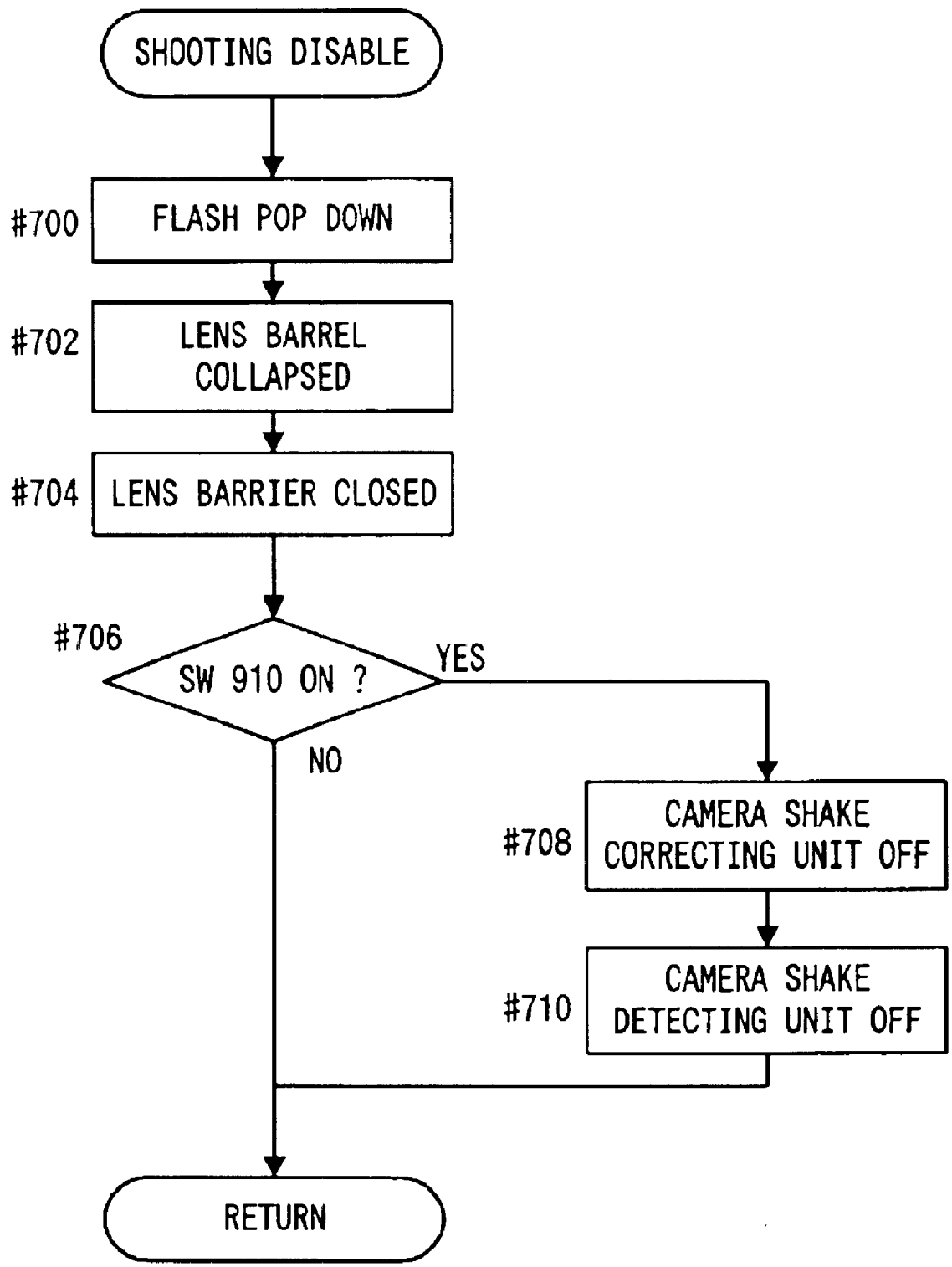
FIG. 23 is a flow chart illustrating a shooting disable process.

The shooting disable process is performed in accordance with the flow chart shown in FIG. 23.

Figure 2:
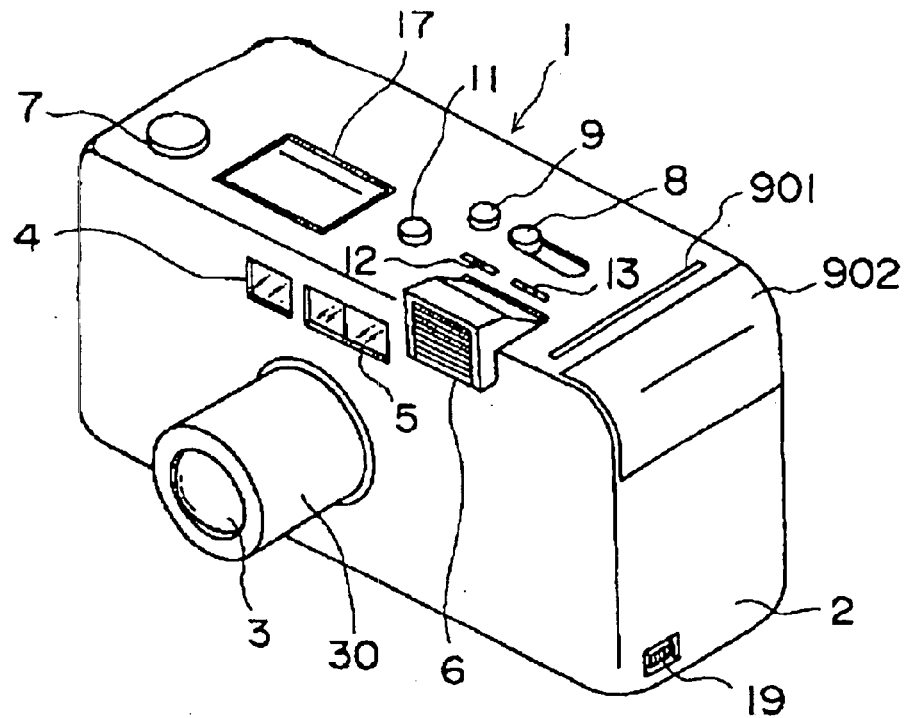
FIG. 2 is a perspective view of the camera of FIG. 1 when it is viewed from the front side.

First, the flash 6 is lowered from the pop up position (in-use position) shown in FIG. 2 to the pop down position (out-of-use position) shown in FIGS. 3 to 5 (step #700). Next, the lens barrel 30 is collapsed (step #702) and the lens barrier 909 is closed (step #704). Thereafter, it is determined whether or not the camera shake correction switch 910 is ON. If the camera shake correction switch 910 is ON (YES in step #706), power supply to the camera shake correcting unit 402 and to the camera shake detecting unit 400 is turned OFF (step #708, step #710) and the flow returns. If the camera shake correction switch 910 is OFF (NO in step #706), step #708 and step #710 are not performed and the flow returns.

Back to FIG. 7, if the main switch SM is ON (YES in step #100), the battery checking as described above is performed (step #100a) and a shooting prepare process is performed (step #100b).

Figure 24:
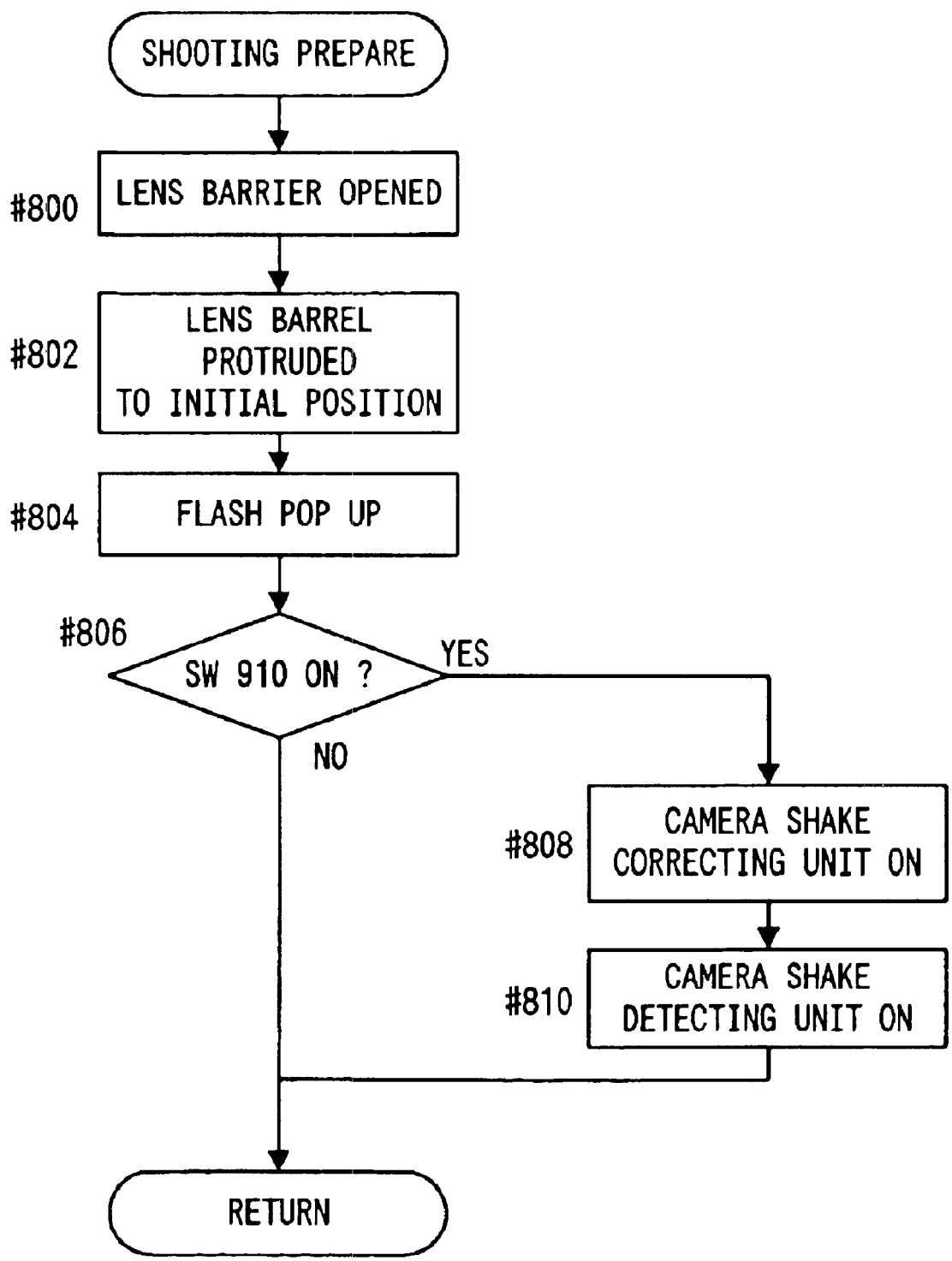
FIG. 24 is a flow chart illustrating a shooting prepare process.

The shooting prepare process is performed in accordance with the flow chart shown in FIG. 24.

First, the lens barrier 909 is opened (step #800) and the lens barrel 30 is protruded to the initial position (step #802). Next, the flash 6 is popped up (step #804) and it is examined whether or not the camera shake correction switch is ON (step #806). If the camera shake correction switch 910 is ON (YES in step #806), power supply to the camera shake correcting unit 402 and to the camera shake detecting unit 400 is turned ON (YES in step #808 and step #810) and the flow returns. If the camera shake correction switch 910 is OFF (NO in step #806), steps #808 and #810 are not performed and the flow returns.

Back to FIG. 7, an interrupt (INT) is enabled (step #104) after the completion of the shooting prepare process (step #100b) and the ON/OFF state of the LCD switch 908 is examined (step #104).

If the LCD switch 908 is OFF (NO in step #104a), it is examined whether or not the image display LCD 905 is ON, i.e., illuminated (step #104b). If the image display LCD 905 is OFF, i.e., unilluminated (NO in step #104b), the flow proceeds to step #105. If the image display LCD 905 is ON (YES in step #104b), power supply to the CCD 101 is halted (step #104c) and the image display LCD 905 is turned OFF (step #104d). Thereafter, the flow proceeds to step #105.

If the LCD switch 908 is ON (YES in step #104a), electric power is supplied to the CCD 101 (step #104e) and the image display LCD 905 is turned ON (step #104f). Thereafter, the flow proceeds to step #105.

Figure 8:
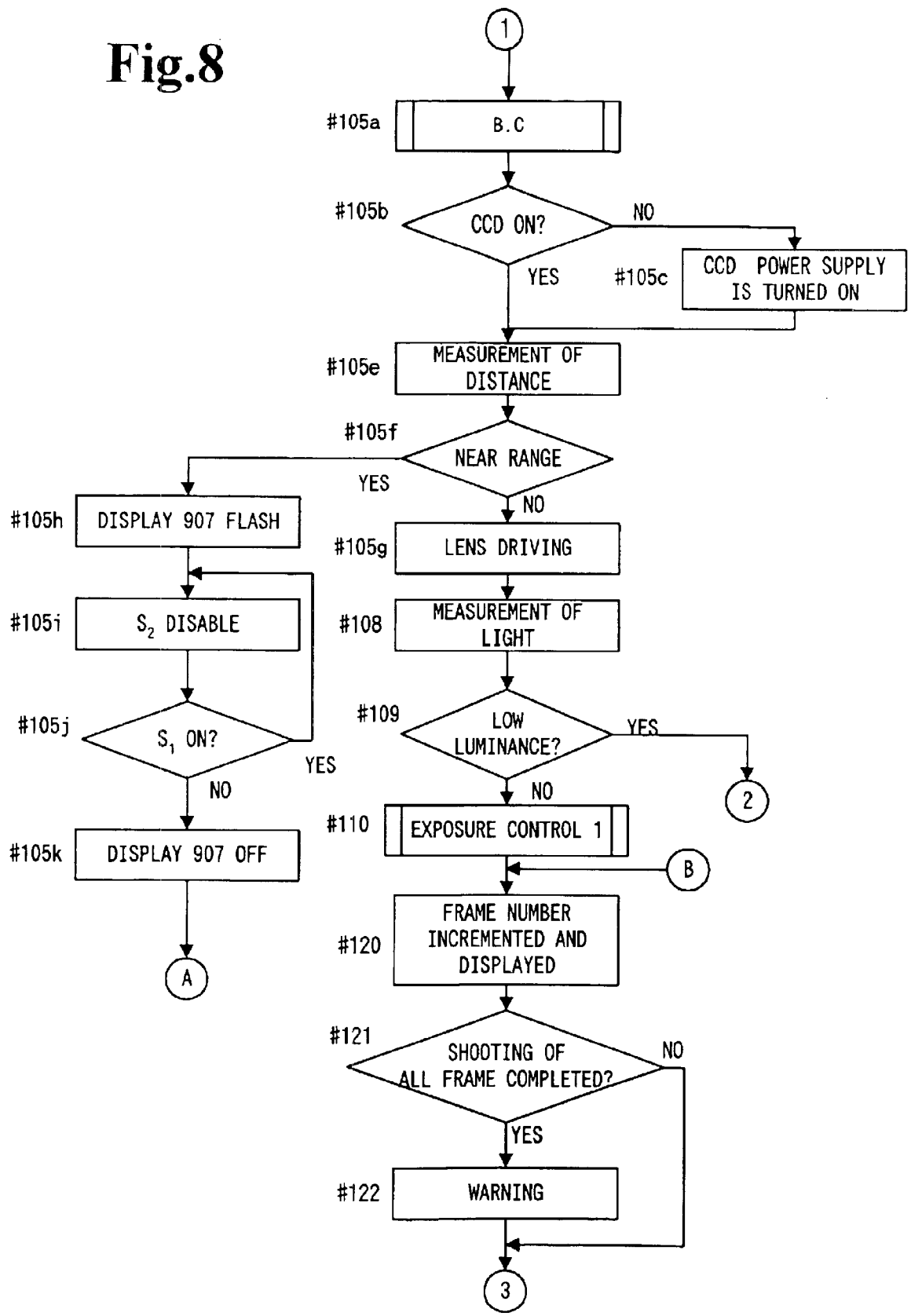
FIG. 8 is a flow chart illustrating the operation of the camera of FIG. 1.

In step #105, it is judged whether or not the release/print start switch 7 has shifted from the OFF state to the ON state by single pressing. i.e., whether or not the switch $S_1$ is ON. If the switch $S_1$ is not ON(NO in step #105), the flow returns to step #100 to repeat the foregoing routine from step #100 to step #105. If the switch $S_1$ is ON (YES in step #105), on the other hand, the flow proceeds to FIG. 8. In FIG. 8, the battery checking as described above is performed (step #105a) and then power is supplied to the CCD 101 if the power supply to the CCD 101 is not ON (step #105b, step #105c).

When power supply to the CCD 101 is initiated, the power source unit 109 supplies, in response to a signal from the CPU 100 shown in FIG. 1, a high voltage VH as a drive voltage to the CCD 101. Simultaneously with the initiation of power supply, an instruction signal for the initialization of the CCD 101 is outputted to the timing generator 201 so that the charge remaining in the CCD 101 is released.

Next, the distance measuring unit 104 performs distance measurement (step #105e) and it is judged whether or not the subject is at near range (step #105f).

If the subject is at near range (YES in step #105f), the focusing display lamp 907 flashes (step #105h) and the turning ON of the switch S2 is disabled (step #105i). Thereafter, the turning OFF of the switch $S_1$ is awaited (step #105j) and, if the switch $S_1$ is turned OFF (NO in step #105j), the focusing display lamp 907 is extinguished (step #105k) and the flow returns to step #100.

If the subject is not at near range (NO in step #105f), the shooting lens 3 is driven to the focusing position (step #105g). Subsequently, the light measuring unit 105 performs light measurement and the exposure time Tv and the f/number Av are calculated (step #108). From the result of light measurement, it is judged whether or not the luminance of the subject is low (step #109).

Figure 9:
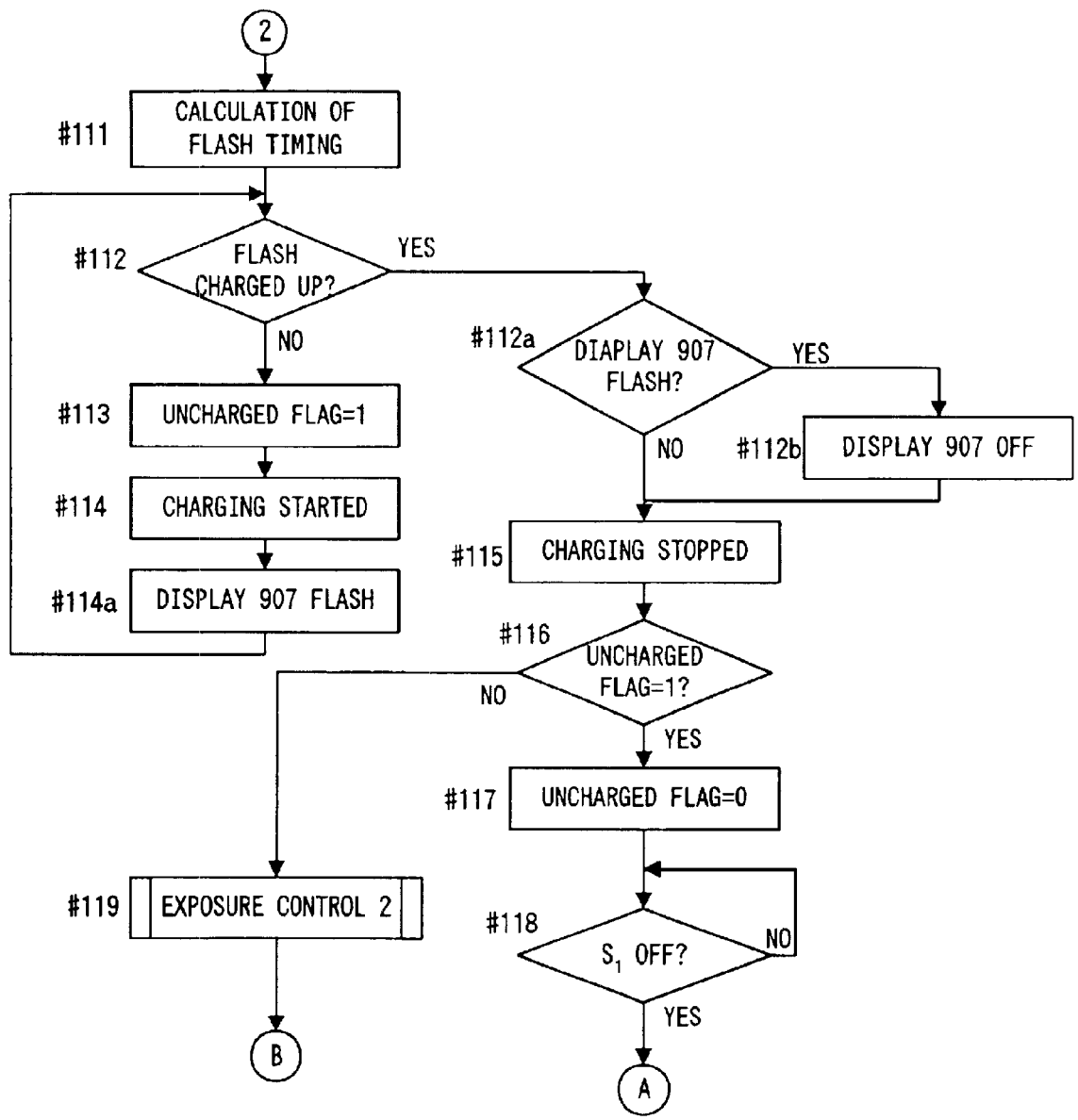
FIG. 9 is a flow chart illustrating the operation of the camera of FIG. 1.

If the luminance of the subject is judged to be low (YES in step #109), the light emission timing for the flash 6 is calculated based on the measured light values (step #111) so that flash shooting is performed, as shown in FIG. 9. Next, it is judged as whether or not charge required for light emission has already been accumulated in a capacitor for charge accumulation within the flash unit 108 (step #112). If the accumulation of charge has not been completed (NO in step #112), an undercharge flag is set to "1" and charging is initiated (step #113, step #114) and the focusing display lamp 907 flashes (114a), so that the flow returns to step #112 to await the completion of charging.

When the charging of the capacitor for charge accumulation is completed (YES in step #112), the focusing display lamp 907 is extinguished if it is flashing (step #112a, step #112b) and the flow proceeds to step #115. In step #115, charging is halted and it is judged in step #116 whether or not the undercharge flag is "1".

If the undercharge flag is "1" (YES in step #116), the undercharge flag is set to "0" in step #117 and the subsequent turning OFF of the switch $S_1$ is awaited (step #118). If the switch $S_1$ is turned OFF (YES in step #118), the flow returns to step #100 and the camera is brought into a so-called release locked state.

If the undercharge flag is "0" in step #116 (NO in step #116), on the other hand, the flow proceeds to step #119 where the subroutine for Exposure Control 2 is executed. After that, the flow proceeds to step #120 in FIG. 8.

Figure 16:
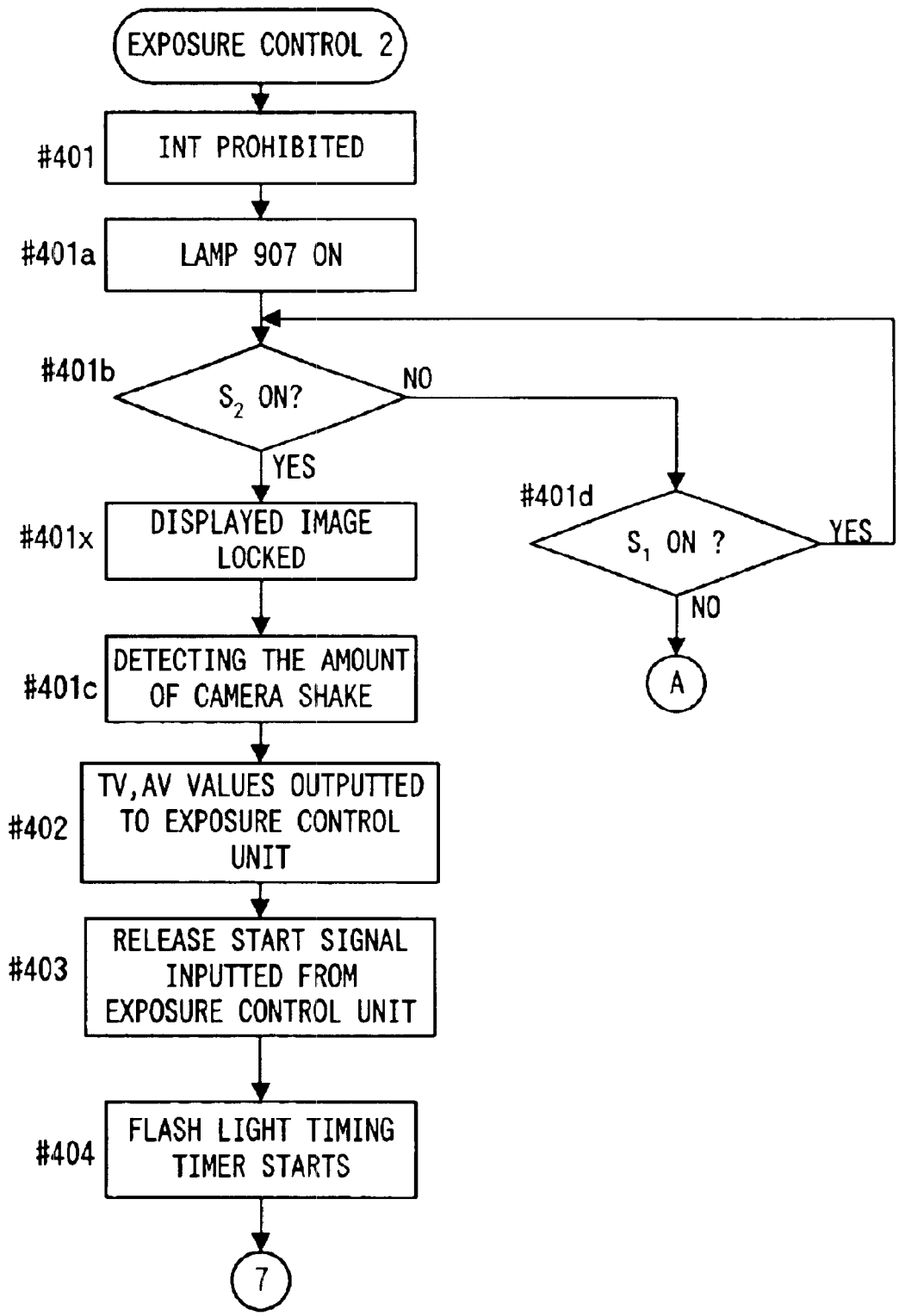
FIG. 16 is a flow chart illustrating Exposure Control 2.
Figure 17:
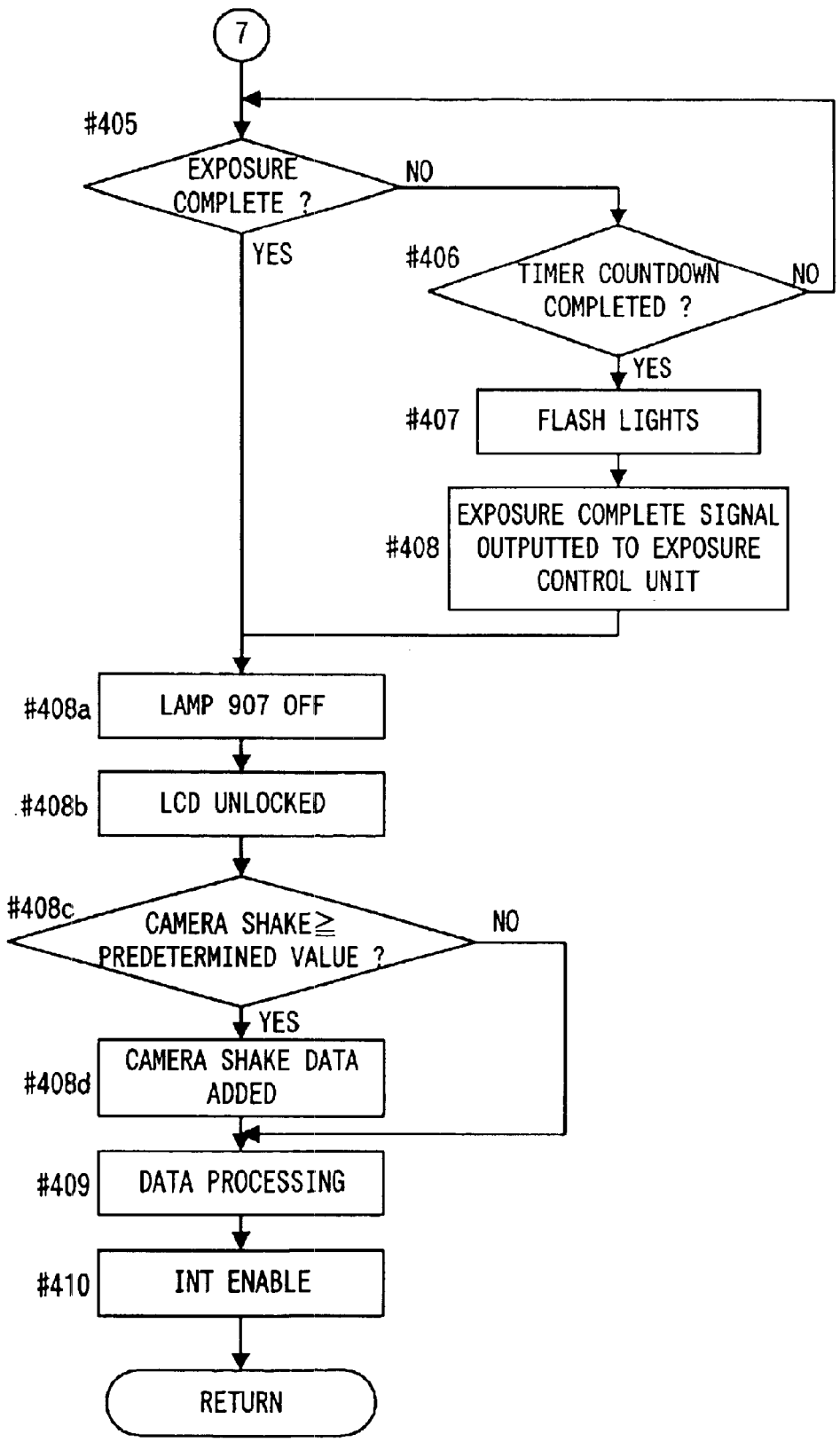
FIG. 17 is a flow chart illustrating Exposure Control 2.

The subroutine for Exposure Control 2 is executed in accordance with the flow charts shown in FIGS. 16 and 17.

First, an interrupt (INT) is disabled (step #401) and the focusing display lamp 907 is lit (step #401a). Thereafter, it is judged whether or not the switch $S_2$ is ON (step #401b).

If the switch $S_2$ is OFF (NO in step #401b) and the switch $S_1$ is ON (YES in step #401d), the flow returns to step #401. If the switch $S_2$ is OFF (NO in step #401b) and the switch S, is OFF (NO in step #401d), the flow proceeds to step #100 in FIG. 7.

When the switch $S_2$ is ON (YES in step #401b), if display on the LCD 905 is ON, an image to be displayed on the image display LCD 905 is locked, i.e., fixed and the same image is displayed (step #401x). Next, the camera shake detecting unit 400 detects the amount of camera shake (step #401c) and the CPU 100 outputs the exposure time Tv and f/number Av calculated based on the result of light measurement to the exposure control unit 106 (step #402). The exposure control unit 106 drives the aperture of the camera main body 1 based on the data and outputs a shutter control signal to the timing generator 201 depending on the exposure time Tv to perform exposure of the CCD 101. Upon receipt of the signal indicative of the initiation of exposure from the exposure control unit 106 (step #403), the CPU 100 starts a timer within the CPU 100 based on the timing for flash light emission obtained in step #111 (step #404). The emission of light from the flash 6 is timed after a given time has elapsed from the initiation of the exposure of the CCD 101.

Next, as shown in FIG. 17, the CPU 100 judges whether or not an exposure complete signal has been inputted thereto from the exposure control unit 106 (step #405). The reason for the judgment is that the exposure time Tv is an expected value and the exposure control unit 106 may output an exposure complete signal even before the time for flash light emission comes if the luminance of the subject is increased abruptly during, e.g., the counting operation of the timer for flash light emission.

That is, if the exposure control unit 106 outputs an exposure complete signal before the time for flash light emission comes (YES in step #405), the flow proceeds to step #408a so that the exposing operation is completed without causing the flash 6 to emit light. If the time for flash light emission has come before the completion of exposure (NO in step #405 and YES in step #406), the CPU 100 causes the flash 6 to emit light. Thereafter, an exposure complete signal is outputted to the exposure control unit 106 (step #407, step #408) and the flow proceeds to step #408a so that the exposing operation is completed.

In, step #408a, the focusing display lamp 907 is extinguished. Next, image display on the image display LCD 905 is unlocked and the shot image from the CCD 101 is monitor-displayed (step #408b). Then, it is judged whether or not the amount of camera shake during exposure is over a predetermined value (step #408c). The predetermined value is, e.g., within the range within which camera shake can be corrected by the camera shake correcting unit 402. If the amount of camera shake is not over the predetermined value (NO in step #408c), only the image signal received from the CCD 101 is written in the image memory 209 of the camera main body 1 (step #409). If the amount of camera shake is over the predetermined value (YES in step #408c), camera shake data is added to the image signal from the CCD 101, which is written in the image memory 209 (step #408d, step #409). Although the present embodiment has added the data only when the amount of camera shake is maximum (when the amount of camera shake detected by the camera shake detecting unit 400 is over the camera shake correctable range), the amount of camera shake may also be recorded constantly. At the completion of the foregoing process, an interrupt (INT) is enabled in step #410.

On the other hand, if it is judged as a result of light measurement that the luminance of the subject is not low in step #109 of FIG. 8 (NO in step #109), the subroutine for Exposure Control 1 not involving flash light emission is executed (step #110).

Figure 15:
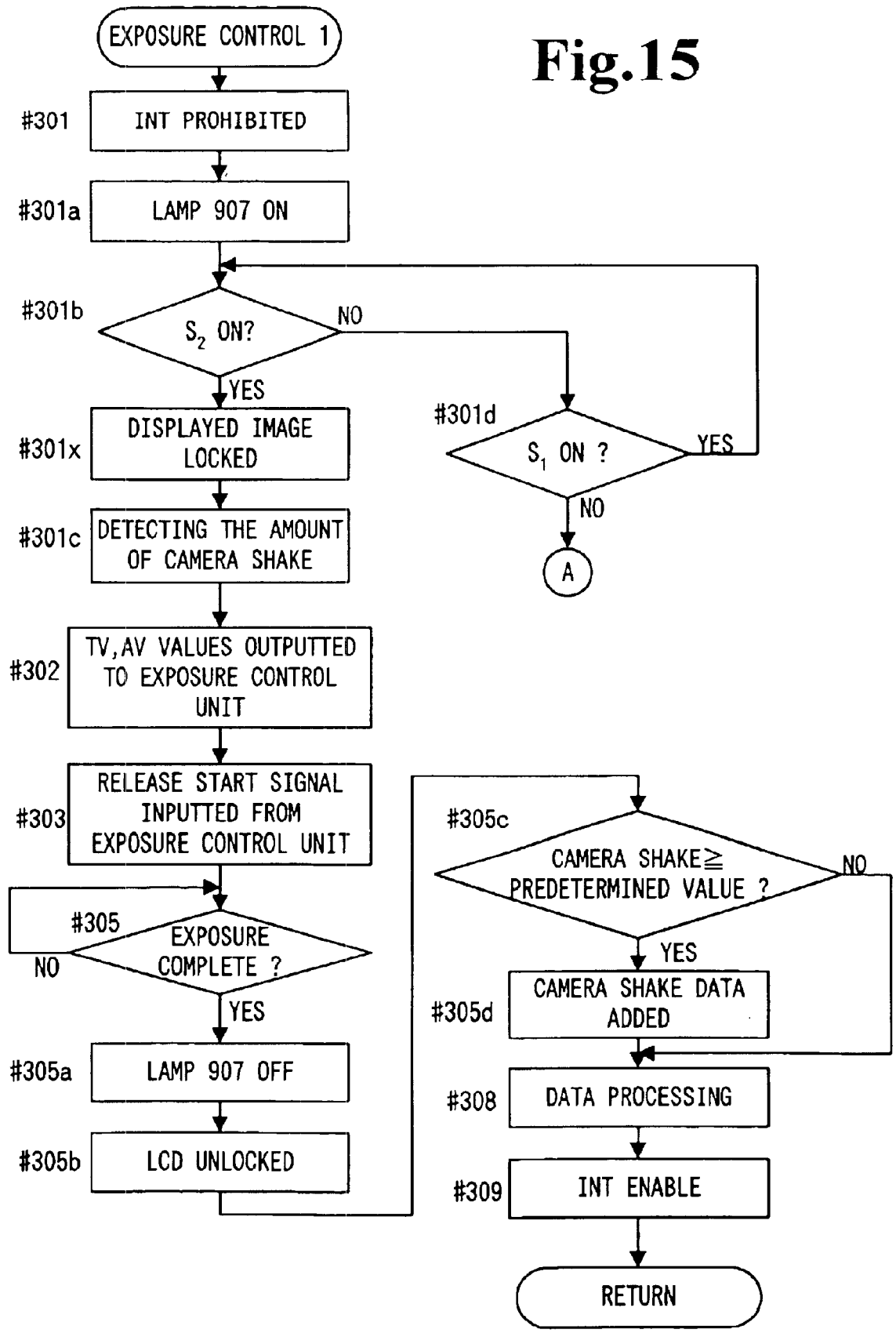
FIG. 15 is a flow chart illustrating Exposure Control 1.

The subroutine for Exposure Control 1 is executed in accordance with the flow chart shown in FIG. 15.

First, an interrupt (INT) is disabled in step #301 and the focusing display lamp 907 is lit (step #301a). Thereafter, it is judged whether or not the switch $S_2$ is ON (step #301b).

If the switch $S_2$ is OFF (NO in step #301b) and the switch $S_1$ is ON (YES in step #301d), the flow proceeds to step #301b. If the switch $S_2$ is OFF (NO in step #301b) and the switch $S_1$ is OFF (NO in step #301d), the flow proceeds to step #100 in FIG. 7.

If the switch $S_2$ is ON (YES in step #301b) and display on the LCD 905 is ON, an image to be displayed on the image display LCD 905 is locked, i.e., fixed and the same image is displayed (step #301x). Next, the camera shake detecting unit 400 detects the amount of camera shake (step #301c) and the CPU 100 outputs the exposure time Tv and f/number Av calculated based on the result of light measurement to the exposure control unit 106 (step #302). The exposure control unit 106 drives the aperture of the camera main body 1 based on the data and outputs a shutter control signal to the timing generator 201 depending on the exposure time Tv to perform exposure of the CCD 101. Upon receipt of the signal indicative of the initiation of exposure from the exposure control unit 106 (step #303), the CPU 100 judges whether or not an exposure complete signal has been outputted from the exposure control unit 106 (step #305). If the exposure time Tv is up, the exposure control unit 106 outputs an exposure complete signal to the CPU 100 (YES in step #305) to complete the exposing operation.

When the exposing operation is completed, the focusing display lamp 907 is extinguished (step #305a) and image display on the image display LCD 905 is unlocked (step #305b), similarly to the process performed in steps #408a to #410 in id the routine for Exposure Control 2. Further, the image signal inputted to the CCD 101 is written in the image memory 209 of the camera main body 1, while the amount of camera shake during the exposing operation is compared with a predetermined value (step #305c). The predetermined value may be the same as or different from the value used in the case of Exposure Control 2 described above, since shooting does not involve flash light emission. If the amount of camera shake is over the predetermined value (YES in step #305c), camera shake data is added to the image signal, which is written in the image memory 209 (step #305d, step #308). At the completion of the foregoing process, the CPU 100 enables an interrupt (INT) in step #309 and completes the exposure control operation.

After the foregoing operations of Exposure Control 1 and Exposure Control 2 are completed, the image signal and camera shake data stored in the image memory 209 is transferred to the memory card 112.

When the subroutines for exposure control in step #110 of FIG. 8 or in step #119 of FIG. 9 are completed, the frame number is updated only by 1 in step #120 of FIG. 8 so that the updated frame number is displayed on the display 17. Next, when the shooting of all the frames is completed and shooting for all the frames within the memory card 112 is completed (YES in step #121), a warning is given on display or by audio in step #122 to draw the photographer's attention. If recording is possible, a warning is not given.

Figure 10:
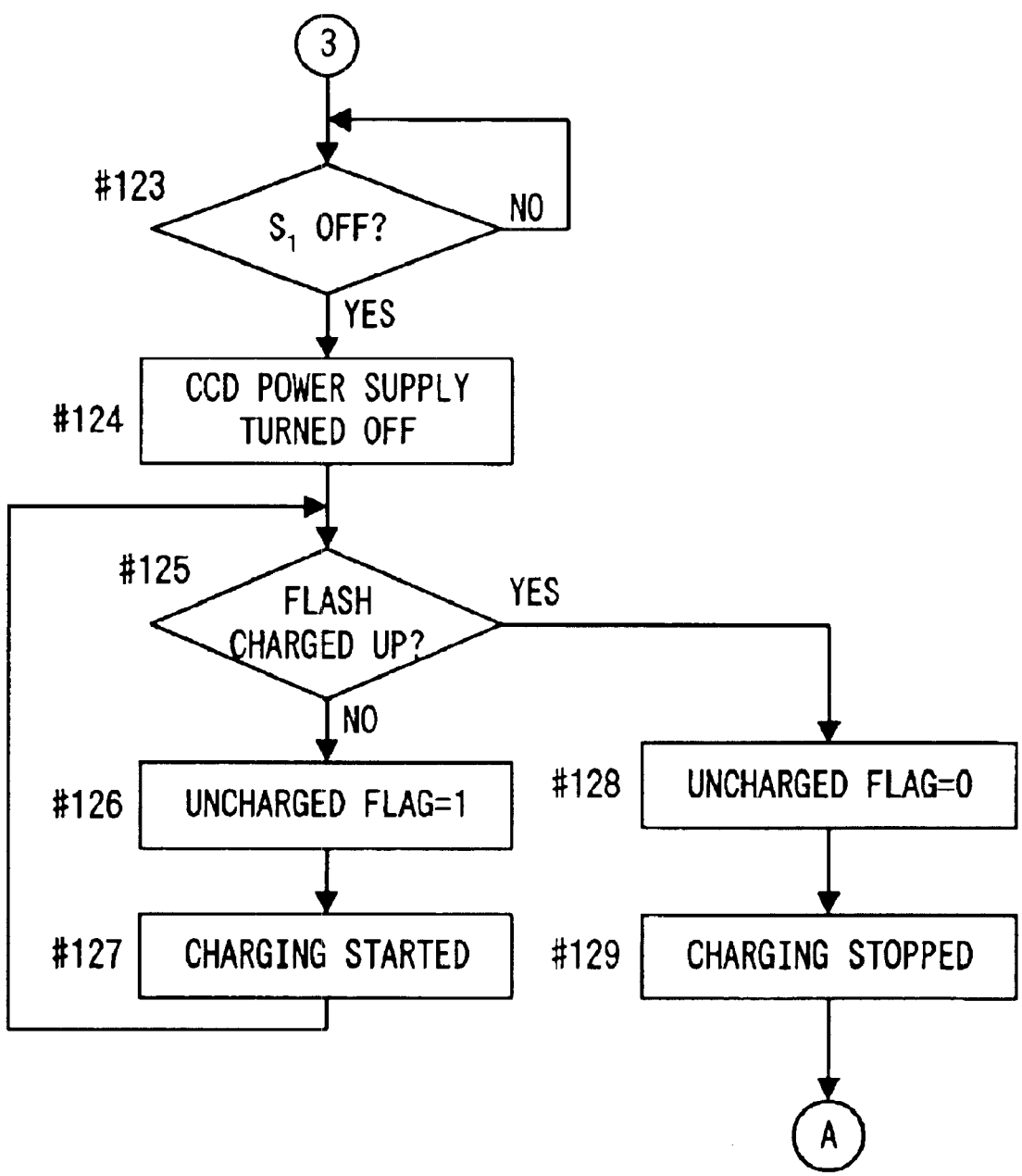
FIG. 10 is a flow chart illustrating the operation of the camera of FIG. 1.

In step #123 of FIG. 10, the CPU 100 awaits the turning OFF of the switch $S_1$ and, if the switch $S_1$ is turned OFF (YES in step #123), the CPU 100 outputs a signal to turn OFF power supply to the CCD 101 and completes shooting for one frame (step #124).

After the foregoing process, it is judged whether or not the charging of the flash 6 has been completed (step #125). If the charging has not been completed (NO in step #125), the undercharge flag is set to "1" and the charging is initiated (step #126, step #127). If the charging has been completed (YES in step #125), the undercharge flag is set to "0" and the charging is halted (step #128, step #129). The flow then returns to step #100 of FIG. 7 and the operations of steps #100 to #129 are repeated.

Next, a description will be given to the process performed if an interrupt (INT) occurs after step #104 where the interrupt (INT) is enabled with reference to the flow charts of FIGS. 11 to 14. The interrupt (INT) occurs when the mode in changeover switch 8 is in the "print" mode position for giving an instruction to print or in the "reproduce" mode position for giving an instruction to reproduce, i.e., when the switch $S_{PRT}$ or $S_{REP}$ is ON. The interrupt (INT) also occurs when the switches 14 and are operated.

When the interrupt (INT) occurs, it is judged in step #201 whether or not the undercharge flag is "1". If the undercharge flag is "1", the charging is temporarily halted in step #202 by judging that the interrupt has occurred during the charging of the capacitor for charge accumulation. If the undercharge flag is "0", step #202 is skipped and it is judged in step #203 whether or not the switch $S_{PRT}$ is ON. If the switch $S_{PRT}$ is ON (YES in step #203), it is judged that the flow has moved to the printing operation. Subsequently, the foregoing battery checking and shooting disable process are performed (step #203a, step #203b) and the flow proceeds to step #204. If the switch $S_{PRT}$ is OFF (NO in step #203), on the other hand, the flow proceeds to step #223.

In step #204, indication of the print mode is shown on the display 17 and then it is judged whether or not the switch 14 has shifted from the OFF state to the ON state, i.e., whether or not the switch 14 has been pressed (step #205). If the switch 14 has been ON (YES in step #205), the flow proceeds to step #206. If the switch 14 remains in the OFF or ON state or is brought from the ON state to the OFF state (NO in step #205), the flow proceeds to step #210.

Figure 22A:
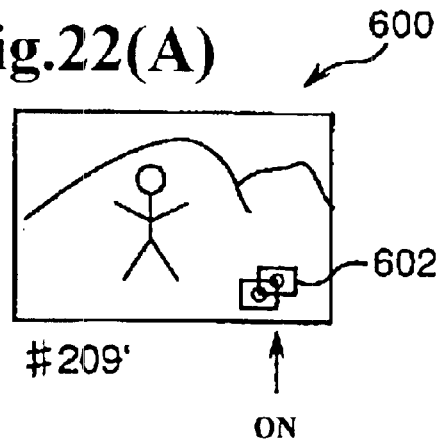
FIGS. 22(A) and 22(B) are exemplary display indicative of the case where blurring exits.
Figure 22B:
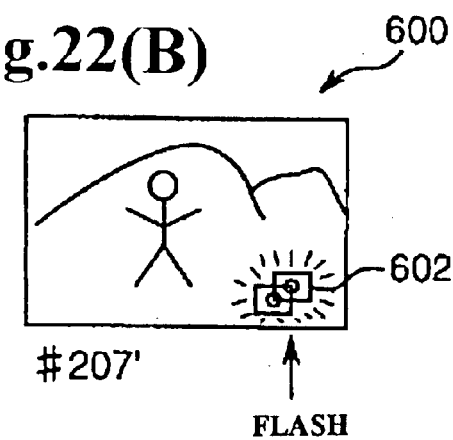

In step #206, the CPU 100 judges that the switch 14 has been pressed, updates the frame number only by 1, and displays the updated frame number on the display 17. An address controller (not shown) further outputs address data corresponding to the frame number to reproduce an image corresponding to the frame number (step #207). After a wait operation is performed for the foregoing process in step #208, image data corresponding to the current frame number is displayed on the image display LCD 905 (step #209). Then, the presence or absence of camera shake is determined based on camera shake data corresponding to the displayed image (step #209a). If there is no camera shake data (NO in step #209a), the flow returns directly to step #205. If there is camera shake data (YES in step #209a), a camera shake mark 602 is illuminated as shown in FIG. 22(A) to indicate in an image display 600 that the displayed image has camera shake data (step #209'), so that the flow returns to step #205. This increments the frame number by 1 every time the switch 14 is turned ON, so that the process of monitor-displaying the image corresponding to the frame number on the image display LCD 905 is repeated.

On the other hand, it is judged in step #210 whether or not the switch 14 is ON. If the switch 14 is ON (YES in step S210), the flow returns to step #205. If the switch 14 is OFF (NO in step #210), the flow moves to step #211 of FIG. 12.

Figure 12:
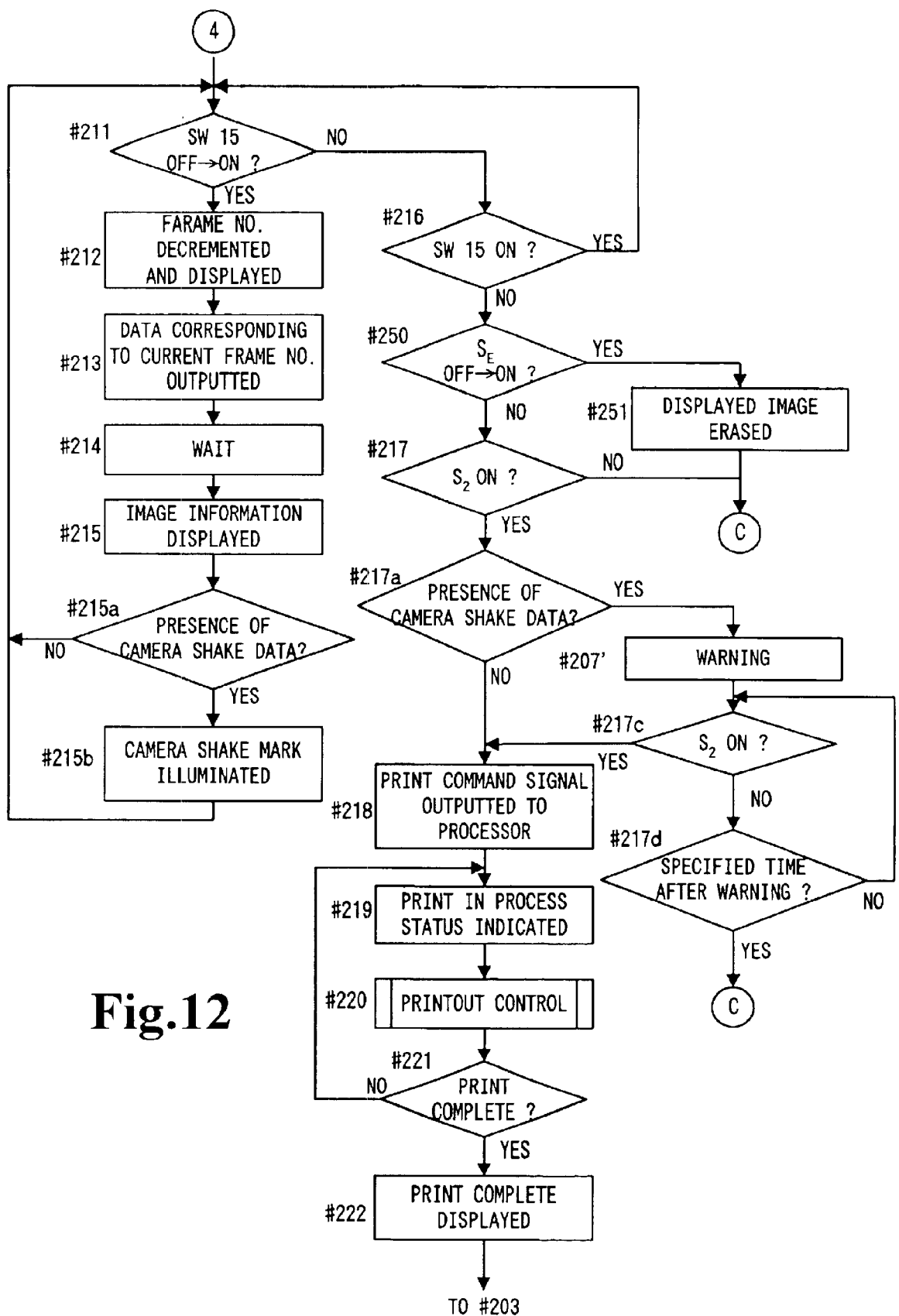
FIG. 12 is a flow chart illustrating the interrupt process.
Figure 13:
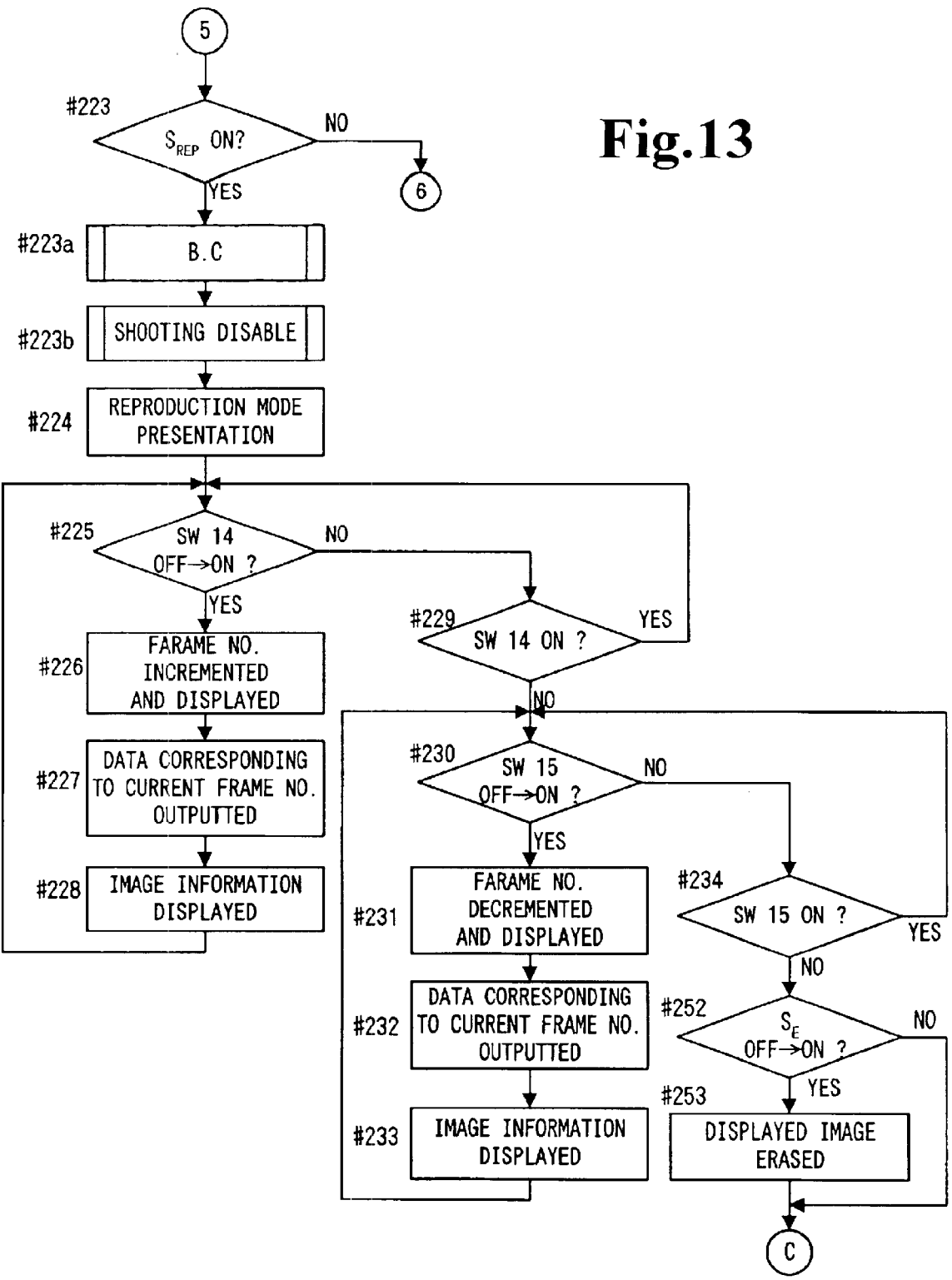
FIG. 13 is a flow chart illustrating the interrupt process.
Figure 14:
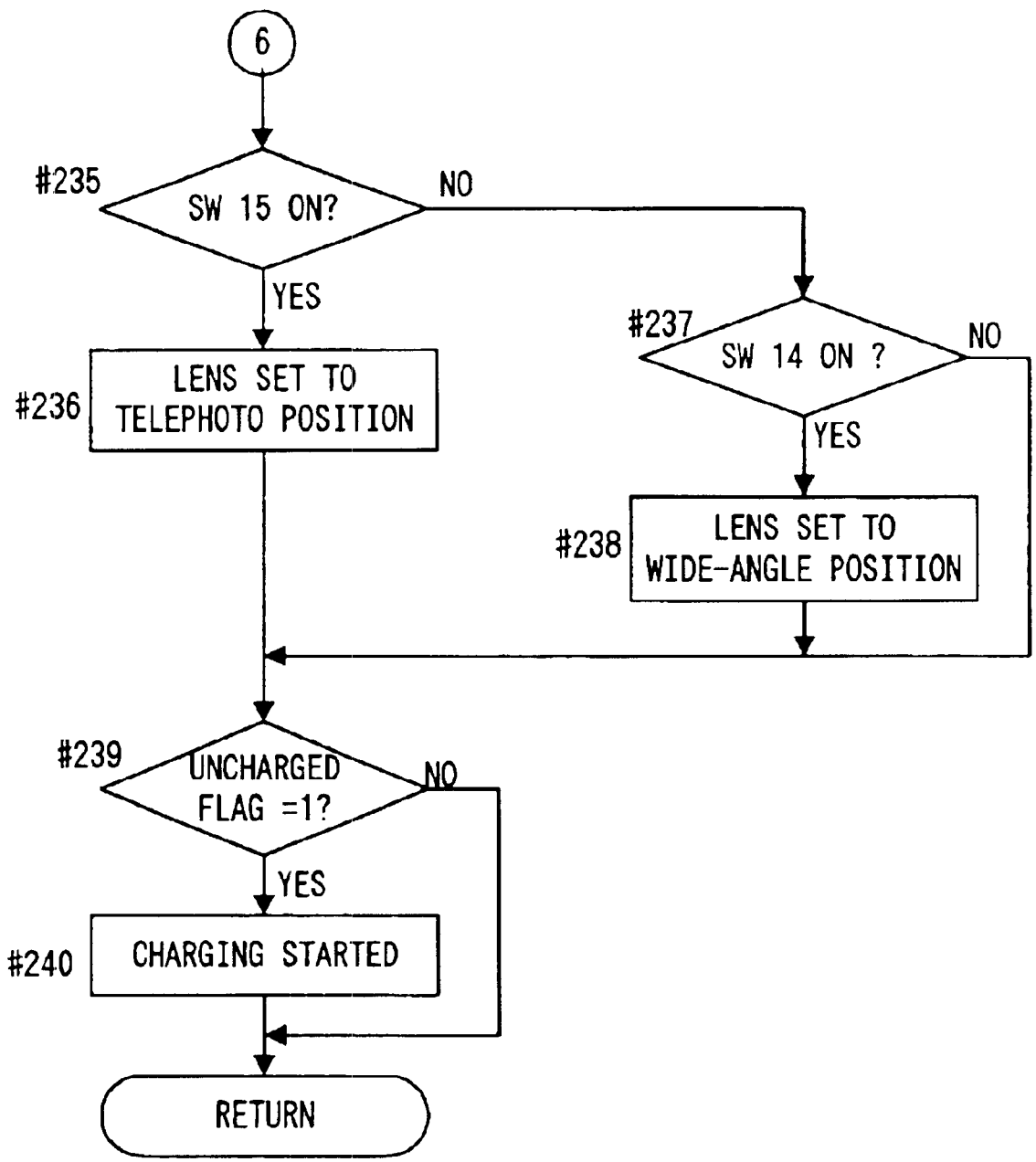
FIG. 14 is a flow chart illustrating the interrupt process.

Next, when the switch 15 is turned ON successively to the switch 14 in FIG. 12 (YES in step #211), the flow moves to step #212. If the switch 15 remains in the OFF or ON state or is brought from the ON state to the OFF state (NO in step #211), the flow moves to step #216.

In step #212, the CPU 100 judges that the switch 15 has been pressed to decrement the frame number only by one and display the decremented frame number on the display 17. The address controller further outputs address data corresponding to the frame number to reproduce an image corresponding to the frame number (step #213). After a wait operation is performed for processing in step #214, image data corresponding to the current frame number is displayed on the image display LCD 905 (step #215). Then, it is judged, based on camera shake data corresponding to the displayed image, whether or not the image in the frame has camera shake data (step #215a). If there is no camera shake data, the process returns directly to step #211. If there is camera shake data, the camera shake mark 602 is illuminated to indicate that the image displayed on the monitor image display 600 has the camera shake data, similar to step #209' (step #215b) and the flow returns to step #211. As a result, the process of decrementing the frame number by 1 every time the switch 15 is turned ON and displaying the image corresponding to the frame number on the image display LCD 905 is repeated.

In step #216, on the other hand, it is judged whether or not the switch 15 is ON. If the switch 15 is ON (YES in step #216), the flow returns to step #211. If the switch 15 is OFF (NO in step #216), the flow moves to step #250.

In step #250, it is judged whether or not the erase switch SE has been turned ON. If the erase switch SE has been turned ON (YES in step #250), the image displayed on the image display LCD 905 is erased (step #251) and the flow moves to step #203 of FIG. 11. If the erase switch SE has not been turned ON(NO in step #250), on the other hand, the flow moves to step #217 where it is judged whether or not the switch $S_2$ has been turned ON.

Figure 11:
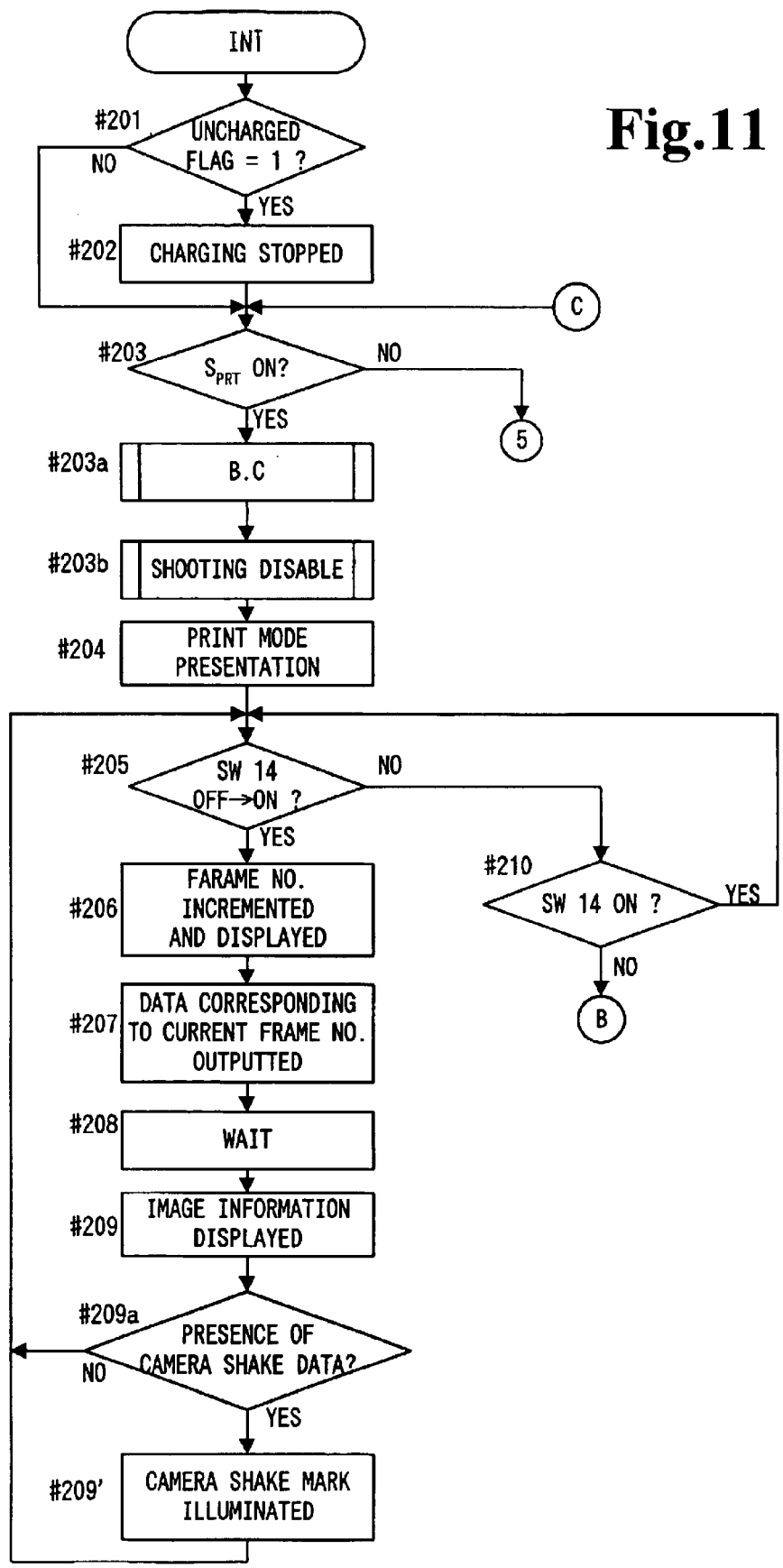
FIG. 11 is a flow chart illustrating an interrupt process.

If the switch $S_2$ has not been turned ON(NO in step #217), the CPU 100 judges that printing should not be performed so that the flow returns to step #203 of FIG. 11 to repeat the foregoing process. If the switch $S_2$ has been turned ON (YES in step #217), the presence or absence of camera shake data in the displayed image is determined (step #217a). If there is no camera shake data (NO in step #217a), the flow proceeds to step #218. If there is camera shake data (YES in step #217a), the camera shake indication 602 is displayed flashing to give a warning that the frame to be printed has camera shake data (step #207'). The flow proceeds to step #218 if the switch $S_2$ is turned ON again within a specified time after the warning. If the switch $S_2$ is not turned ON within the specified time after the warning, the flow proceeds to step #203 (step #217c, step #217d).

In step #218, the CPU 100 outputs a print instruction signal to the image processing unit 300 so that the flow moves to the printing operation. Upon receipt of the signal, the image processing unit 300 initiates signal processing for the printing operation. The CPU 100 displays that printing is currently performed on the display 17 (step #219), while controlling the printing operation (step #220).

Figure 19:
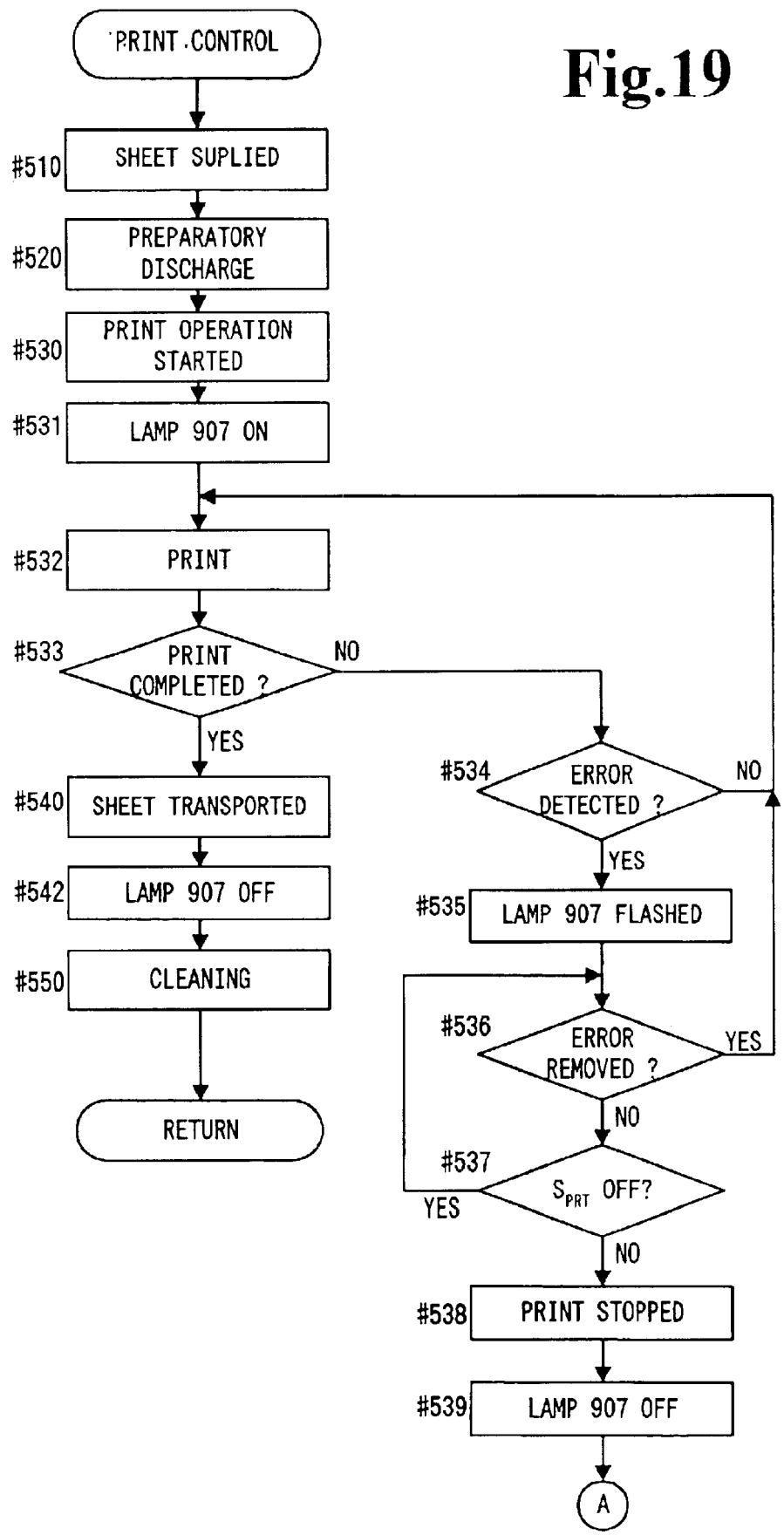
FIG. 19 is a flow chart illustrating the control of the printer unit.

The control of the printing operation is executed in accordance with the sequence shown in FIG. 19.

That is, the CPU 100 instructs a sheet, that is to be printed, to be supplied to the printing position (step #510). Then, at the home position of the recording head 5', preparatory discharge is performed to ensure the printing operation (step #520). The preparatory discharge is for eliminating the clogging of the recording head 5'. The preparatory discharge is also for recovering, e.g., the nozzle having degraded performance due to, e.g., the pigment of ink from which moisture has evaporated.

Next, the CPU 100 initiates the printing operation (step #530). That is, the focusing display lamp 907 is lit (step #531) and image data is image-processed to be outputted from the printer and then printed out of the printer unit 111 (step #532). During printing (NO in step #533), the occurrence of an error is monitored (step #534). If an error is detected (YES in step #534), the printing out is interrupted and the display lamp 907 flashes (step #535). If the error is removed (YES in step #534), the flow proceeds to step #535 so that the printing operation is continued. If the error is not removed (NO in step #536), the turning OFF of the switch $S_{PRT}$ is awaited (step #537). When the switch $S_{PRT}$ is turned OFF, the CPU 100 halts printing (step #538) and the focusing display lamp 907 is extinguished so that the flow returns to step #100 of FIG. 7.

When the specified printing operation is completed (YES in step #533), the sheet 11' printed in the printer unit 111 is transported from the outlet 901 of the camera main body 1 to the position where the printed sheet 11' is prevented from falling (step #540). Thereafter, the focusing display lamp 907 is extinguished (step #942) and the user recognizes the completion of the printing operation. Next, the CPU 100 transmits a print complete signal and returns the carriage 4' to the home position so that cleaning operation is performed (step #550).

The preparatory discharge and the cleaning operation are performed to render recording more effective in a printer in an inkjet printing system, whereby the recording head 5' is cleaned with cleaning means such as a suction pump, a cleaning blade, or the like.

The printing is completed in step #221 of FIG. 12. If a print complete signal has been outputted (YES in step #221), the CPU 100 displays the completion of the printing on the display 17 (step #222). By the foregoing operations, the printing for one frame is completed so that the flow returns to step #203 of FIG. 11.

If the turning ON of the switch $S_{PRT}$ has not been detected in step #203 of FIG. 11 (NO in step #203), on the other hand, the CPU 100 does not perform the printing operation but performs the operations of the steps subsequent to step #223. In step #223, it is judged whether or not the reproduction switch $S_{REP}$ has been turned ON. If the reproduction switch $S_{REP}$ is OFF (NO in step #223), the CPU 100 does not perform reproductive display on the image display LCD 905 and moves to step #235 of FIG. 14. If the reproduction switch $S_{REP}$ is ON (YES in step #223), on the other hand, the foregoing battery checking is performed (step #223a) so that the foregoing shooting disable process is performed (step #223b). Thereafter, the reproduce mode is displayed on the display 17 to indicate that reproduction will be performed on the image reproduction LCD 905 (step #224).

In the reproduction mode, it is subsequently judged whether the switch 14 or 15 has been turned ON (step #225, step #230).

If the switch 14 remains in the OFF or ON state or is brought from the ON state to the OFF state (NO in step #225), the flow moves to step #229. If the switch 14 is turned ON (YES in step #225), on the other hand, the frame number is incremented only by 1 and the updated frame number is displayed, while the address controller outputs address data corresponding to the current frame number to reproduce an image corresponding to the frame number (step #226, step #227). Subsequently, image data corresponding to the current frame number is displayed (step #228), as described above. Then, the flow returns to step #225 and the process of incrementing the frame number by 1 every time the switch 14 is turned ON and displaying the image corresponding to the frame number on the image display LCD 905 is repeated.

In step #229, on the other hand, it is judged whether or not the switch 14 is ON. If the switch 14 is ON (YES in step #229), the flow returns to step #225. If the switch 14 is OFF (NO in step #229), the flow moves to step #230.

Next, if the switch 15 is turned ON successively to the switch 14 (YES in step #230), the flow moves to step #231. On the other hand, if the switch 15 remains in the OFF or ON state or brought from the ON state to the OFF state (NO in step #230), the flow moves to step #234.

In step #231, the frame number is decremented only by 1 and displayed by judging that the switch 15 has been pressed, while the address controller outputs address data corresponding to the frame number to reproduce an image corresponding to the frame number (step #231, step #232). Subsequently image data corresponding to the current frame number is displayed (step #233), as described above. Then, the flow returns to step #230 and the process of decrementing the frame number by 1 every time the switch 15 is turned ON and displaying the image corresponding the frame number is repeated.

In step #234, on the other hand, it is judged whether or not the switch 15 is ON. If the switch 15 is ON (YES in step #234), the flow returns to step #230. If the switch 15 is OFF (NO in step #234), the flow proceeds to step #252.

In step #252, it is judged whether or not the erase switch SE has been turned ON. If the erase switch SE has been turned ON (YES in step #252), the displayed image is erased (step #253) and the flow returns to step #203. If the erase switch $S_E$ has not been turned ON(NO in step #252), on the other hand, the flow returns directly to step #203.

The process flow subsequent to #235 is a judgment routine for the switches 14 and 15 during shooting, i.e., when printing or reproduction is not performed. When the switch 15 is turned ON (YES in step #235), the shooting lens 3 is switched to the extreme telephoto side (step #236). If the switch 14 is turned ON (YES in step #237), on the other hand, the shooting lens 3 is switched to the extreme wide-angle side (step #238). If each of the switches 14 and 15 is OFF, the shooting lens 3 is not it switched. Finally in the interrupt routine, it is judged whether or not the undercharge jag flag is "1" (step #239). If the undercharge flag is "1" (YES in step #239), an interrupt has occurred during charging so that the CPU 100 resumes the charging operation that has been interrupted in the undercharged state (step #240). If the undercharge a flag is "0", the charging operation is not resumed.

In the arrangement, if the printing operation is selected, the moving member is brought into the out-of-use state. In other words, the moving member moves to the out-of-use position. When the moving member is in the out-of-use state, the whole apparatus is well balanced so that it is possible to prevent the camera from swaying considerably even if a member such as a printer head moves during printing.

In the digital camera having a printing function described above, the moving member for shooting is prevented from causing the whole apparatus to lose balance during the printing operation and adversely affecting the printing operation.

It is to be noted that the present invention is not limited to the foregoing embodiments and can be practiced in various other forms. For example, the present invention is also applicable in exactly the same manner to a digital camera having a printing function in which a printer portion is detachable from a camera main body.

Furthermore, the present invention is applicable, in exactly the same manner, to a digital video camera having a printing function in which the moving image is recorded.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

The foregoing description of the preferred embodiments of the invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A digital camera having a printing function comprising:
    a moving member for moving from an out-of-use position to an in-use position to perform a shooting operation;
    a selector for selecting a printing operation to be performed; and
    a controller for bringing the moving member into the out-of-use position in response to the selection of the printing operation by the selector, wherein
    the moving member in the out-of-use position is configured not to operate during the printing operation.

2. The digital camera of claim 1, wherein the moving member is a flash protruded from a storage position in a camera main body during shooting and, in response to the selection of the printing operation, the controller drives the flash to the storage position in the camera main body.

3. The digital camera of claim 1, wherein the moving member is a shooting lens barrel protruding from a camera main body during shooting and, in response to the selection of the printing operation, the controller drives the shooting lens barrel to a collapsed position.

4. A digital camera having a printing function comprising:
    a lens cover for moving from an in-use position to an out-of-use position to perform a shooting operation;
    a selector for selecting a printing operation to be performed; and
    a controller for driving the lens cover to the in-use position in which a shooting lens is covered therewith in response to the selection of the printing operation.

5. A digital camera having a printing function comprising:
    a moving member for moving from a storage position to a protruded position;
    a selector for selecting a printing operation to be performed; and
    a controller for bringing the moving member into the storage position in response to the selection of the printing operation by the selector, wherein
    the moving member in the storage position is configured not to operate during the printing operation.

6. The digital camera of claim 5, wherein the moving member is at least one of a flash and a shooting lens barrel.

7. A method of controlling a digital camera having a printing function, the method comprising steps of:
    moving a moving member from an out-of-use position to an in-use position to perform a shooting operation;
    selecting a printing operation to be performed; and
    bringing the moving member into the out-of-use position in response to the selection of the printing operation, wherein
    the moving member in the out-of use position is configured not to operate during the printing operation.

8. A method of controlling a digital camera having a printing function, the method comprising steps of:
    moving a lens cover from an in-use position to an out-of-use position to perform a shooting operation;
    selecting a printing operation to be performed; and
    driving the lens cover to the in-use position in which a shooting lens is covered therewith in response to the selection of the printing operation.

9. A method of controlling a digital camera having a printing function, the method comprising steps of:
    moving a moving member from a storage position to a protruded position to perform a shooting operation;
    selecting a printing operation to be performed; and
    bringing the moving member, into the storage position in response to the selection of the printing operation, wherein
    the moving member in the storage position is configured not to operate during the printing operation.

* * * * *